US012388790B2

(12) United States Patent
Jasner et al.

(10) Patent No.: US 12,388,790 B2
(45) Date of Patent: Aug. 12, 2025

(54) VPN MANAGER AND MONITOR FOR VPN CONNECTION SELECTION

(71) Applicant: ARRIS Enterprises LLC, Suwanee, GA (US)

(72) Inventors: Marc E. Jasner, Horsham, PA (US); John D. Ogden, Media, PA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 395 days.

(21) Appl. No.: 17/574,791

(22) Filed: Jan. 13, 2022

(65) Prior Publication Data

US 2022/0263804 A1    Aug. 18, 2022

Related U.S. Application Data

(60) Provisional application No. 63/148,821, filed on Feb. 12, 2021.

(51) Int. Cl.
*H04L 9/40* (2022.01)
*H04L 43/0811* (2022.01)
*H04L 45/30* (2022.01)
*H04L 45/302* (2022.01)
*H04L 67/1027* (2022.01)

(52) U.S. Cl.
CPC ...... *H04L 63/0272* (2013.01); *H04L 43/0811* (2013.01); *H04L 45/306* (2013.01); *H04L 67/1027* (2013.01)

(58) Field of Classification Search
CPC ............. H04L 63/0272; H04L 43/0811; H04L 45/306; H04L 67/1027; H04L 43/0852; H04L 43/0876; H04L 43/10
USPC .......................................................... 726/15
See application file for complete search history.

(56) References Cited

U.S. PATENT DOCUMENTS

| 9,419,944 B2 * | 8/2016 | Chan ................... H04L 41/0893 |
| 9,813,379 B1 * | 11/2017 | Shevade ................. H04L 45/24 |
| 10,462,171 B2 * | 10/2019 | Weingarten ............... G06F 8/61 |
| 10,659,325 B2 * | 5/2020 | Dam ..................... H04L 43/045 |

(Continued)

OTHER PUBLICATIONS

Virtual Private Networks and Their Role in E-Business (Year: 2002).*

*Primary Examiner* — Taghi T Arani
*Assistant Examiner* — Pegah Barzegar
(74) *Attorney, Agent, or Firm* — Wenderoth, Lind & Ponack, L.L.P.

(57) ABSTRACT

Dependence on Virtual Private Network (VPN) connections to a target source continues to increase along with the need for improved connection reliability and speed. A VPN manager provides an automatic or seamless switching of the routing of data or traffic directed to an initial VPN connection associated with an initial VPN gateway at the target source to a different VPN connection associated with a different VPN gateway of the target source. The VPN manager can select a VPN connection based on a monitored VPN session status. The VPN session status can be based on one or more VPN status parameters. The VPN session status can be customized. Switching routing from an initial VPN connection to a different VPN connection provides a VPN session with the VPN connection that meets the requirements of a user providing an enhanced the Quality of experience (QoE) of a user.

17 Claims, 9 Drawing Sheets

(56) References Cited

U.S. PATENT DOCUMENTS

| | | | |
|---|---|---|---|
| 11,604,880 B2* | 3/2023 | Robison | H04L 9/0891 |
| 11,658,984 B2* | 5/2023 | Gujarathi | H04L 9/3213 |
| | | | 713/176 |
| 11,736,526 B2* | 8/2023 | Jeong | H04L 63/1458 |
| | | | 726/1 |
| 11,824,862 B1* | 11/2023 | Singh | H04L 63/101 |
| 2002/0124090 A1* | 9/2002 | Poier | H04L 63/061 |
| | | | 709/228 |
| 2012/0059934 A1* | 3/2012 | Rafiq | H04L 67/1008 |
| | | | 709/225 |
| 2015/0382193 A1* | 12/2015 | Johnson | H04L 63/08 |
| | | | 455/411 |
| 2016/0359811 A1* | 12/2016 | Chan | H04L 63/0272 |
| 2016/0359866 A1* | 12/2016 | Mixer | H04L 67/12 |
| 2017/0171156 A1* | 6/2017 | Schultz | H04L 63/0414 |
| 2017/0199752 A1* | 7/2017 | Cao | G06F 11/3409 |
| 2017/0366421 A1* | 12/2017 | Dam | H04L 43/50 |
| 2019/0052659 A1* | 2/2019 | Weingarten | H04L 67/10 |
| 2019/0132361 A1* | 5/2019 | Hernandez | H04L 47/20 |
| 2022/0116273 A1* | 4/2022 | Cunningham | H04L 43/0811 |
| 2022/0263804 A1* | 8/2022 | Jasner | H04L 45/306 |
| 2022/0343157 A1* | 10/2022 | Mankowitz | G06N 3/008 |
| 2023/0007030 A1* | 1/2023 | Weingarten | H04L 41/0894 |
| 2023/0061123 A1* | 3/2023 | Low | H04L 9/30 |
| 2023/0119545 A1* | 4/2023 | Kelly | H04L 45/70 |
| | | | 709/238 |
| 2023/0135587 A1* | 5/2023 | Wraback | H04L 63/20 |
| | | | 726/1 |
| 2023/0344899 A1* | 10/2023 | Zhu | H04L 67/1008 |
| 2024/0288584 A1* | 8/2024 | Uyeno | G01S 7/4817 |

\* cited by examiner

VPN MANAGER AND MONITOR FOR VPN CONNECTION SELECTION

BACKGROUND

Many users whether private or associated with entities or organizations are increasingly communicating over multiple types of networks, connections, and systems from multiple locations or sites. Each user may utilize any number of different types of devices with these devices networked together so as to provide access to shared data, resources or services. For example, many users are accessing data, resources and services remotely. Such remote access can create security issues especially with respect to the transmission of and access to sensitive or personal data. A virtual private network (VPN) can provide a secure connection through which users can transmit, send, access, or receive remote data, resources, or services.

With this dependence on VPN to provide secure connections, a need exists to provide increased network performance, for example, increased reliability and speed. Ideally, a VPN connection would provide the best-suited network connection, for example, the fastest, the highest bandwidth and lowest latency, network connection. Generally, VPN client software of a client device allows a user to select a VPN gateway from a list of multiple available gateways. A VPN connection is established between the client device and the VPN gateway and this VPN connection to the VPN gateway is maintained for the client device throughout a VPN session or until disconnection. A VPN connection is established on a per client device basis such that each client device must establish a VPN connection with a selected VPN gateway. This selected VPN gateway is static such that the VPN connection to the selected VPN gateway remains a one-to-one connection until disconnection.

Once a VPN connection is established between a client device and a selected VPN gateway, that VPN connection is maintained even if a different VPN gateway would provide increased network performance or an improved user experience. Thus, there is a need to provide a more dynamic VPN connection experience so as to provide an overall improved network performance and/or user experience.

SUMMARY

Network environments, especially those network environments associated with remote access, can now serve multiple functions for various types of users and client devices that need to connect to remote data, resources or services. For example, the same network can be required to support a variety of users and client devices as well as a variety of VPN connections to various selected VPN gateways so as to provide the users with access to remote data, resources and services. Given the various network activities and access requirements that include substantial reliance on Internet access, especially Wi-Fi Internet access, and increased access to network data, resources and services, it is becoming imperative to provide the best optimized and secure connections to remote data, resources and services to all users and/or client devices in a network environment. These secure connections can be provided using a VPN client software that establishes a VPN connection to a selected VPN gateway. VPN connections are generally made on a per client device basis, with each client device requiring an associated distinct VPN client. A VPN manager that manages and monitors one or more VPN connections can improve one or more network parameters and/or user experience. For example, the VPN manager can provide various improvements to accessing a VPN gateway via a VPN connection. The VPN manager can be configured to connect to a VPN gateway via one or more corresponding VPN connections, maintain the one or more VPN connections, monitor a status (such as a health status or any other network or connectivity status) of the one or more VPN connections, automatically and transparently route traffic over the VPN connection based on one or more factors, such as the associated status or health of the VPN connection, allow a plurality of client devices to route traffic over any one or more of the VPN connections similar to the way a router allows multiple network devices connected to use the same wide area network (WAN) connection, allow customization of network packet or traffic routing through the different VPN client sessions associated with the VPN connections, provide a control interface for managing the VPN client sessions either locally or remotely, provide access through the VPN client sessions without having to configure the VPN client interface on any given locally connected client device, any combination thereof. Providing an automatic switching of a VPN connection via a selected VPN gateway to a different VPN connection via another VPN gateway that provides an increased or improved network performance can enhance the quality of experience (QoE) of a user associated with a client device.

One or more novel solutions of the present disclosure provide a VPN management device 2 that can comprise a VPN manager. The VPN manager can comprise a VPN configuration manager, a VPN routing manager, a VPN connection monitor, one or more VPN connections, and any combination thereof. The one or more VPN connections provide access to one or more corresponding VPN gateways so that any client device within a network environment can access data, resources or services via the corresponding VPN gateway. The VPN manager can switch routing of traffic or packets via a first VPN connection to another VPN connection based on a status associated with a VPN session and/or one or more VPN connections based on one or more VPN status parameters. The switch can be made automatically so that the user does not experience in any noticeable interruption in the access to data, resources or services.

An aspect of the present disclosure provides a method for a virtual private network (VPN) manager to manage a plurality of VPN connections to a target source via a plurality of VPN gateways. The method comprises receiving, from one or more client devices, data directed to the target source, determining a VPN session status associated with one or more of the plurality of VPN connections, wherein each of the plurality of VPN connections corresponds to a separate one of the plurality of VPN gateways, selecting a first VPN connection of the plurality of VPN connections based on the VPN session status, and routing the data to the first VPN connection.

In an aspect of the present disclosure, the method is such that determining the VPN session status comprises analyzing one or more VPN session status criteria associated with the one or more of the plurality of VPN connections.

In an aspect of the present disclosure, the method further comprises monitoring the VPN session status of the one or more of the plurality of VPN connections, selecting a second VPN connection of the plurality of VPN connections based on the VPN session status, and switching routing of the data from the first VPN connection to the second VPN connection.

In an aspect of the present disclosure, the method is such that monitoring the VPN session status is performed based on a timed interval.

In an aspect of the present disclosure, the method is such that determining the VPN session status comprises performing a load balancing of the plurality of VPN connections.

In an aspect of the present disclosure, the method further comprises determining a type of data associated with the data, wherein determining the VPN session status is based on the type of data, wherein the first VPN connection is associated with a first type of data and a second VPN connection is associated with a second type of data.

In an aspect of the present disclosure, the method further comprises receiving additional data from an additional client device, determining an additional VPN session status, selecting a second VPN connection of the plurality of VPN connections based on the VPN session status, and routing the additional data to the second VPN connection.

An aspect of the present disclosure provides a virtual private network (VPN) management device. the VPN manager comprises a VPN configuration manager that manages a plurality of VPN connections to a target source via a plurality of VPN gateways, wherein each of the plurality of VPN connections corresponds to a separate one of the plurality of VPN gateways, a VPN connection monitor that determines the VPN session status associated with one or more of the plurality of VPN connections, and a VPN routing manager that receives data from one or more client devices directed to the target source, selects a first VPN connection of the plurality of VPN connections based on the VPN session status, and routes the data to the first VPN connection.

In an aspect of the present disclosure, the VPN manager is such that determining the VPN session status comprises analyzing one or more VPN session status criteria associated with the one or more of the plurality of VPN connections, wherein the VPN session status criteria comprise any of a connection state, a ping speed, a speed test, a throughput rate, a bandwidth, a latency, a received signal strength indicator, and any combination thereof.

In an aspect of the present disclosure, the VPN connection monitor further monitors the VPN session status of the one or more of the plurality of VPN connections, and the VPN routing manager further selects a second VPN connection of the plurality of VPN connections based on the VPN session status and switches routing of the data from the first VPN connection to the second VPN connection.

In an aspect of the present disclosure, the monitoring the VPN session status is performed based on a timed interval.

In an aspect of the present disclosure, the determining the VPN session status comprises performing a load balancing of the plurality of VPN connections.

In an aspect of the present disclosure, the VPN routing manager further determines a type of data associated with the data, the determining the VPN session status is based on the type of data, and the first VPN connection is associated with a first type of data and the second VPN connection is associated with a second type of data.

In an aspect of the present disclosure, the routing manager further receives additional data from an additional client device, the VPN connection monitor determines an additional VPN session status, and the VPN routing manager further selects a second VPN connection of the plurality of VPN connections based on the additional VPN session status and routes the additional data to the second VPN connection.

An aspect of the present disclosure provides a non-transitory computer-readable medium storing one or more instructions for managing a plurality of virtual private network (VPN) connections to a target source via a plurality of VPN gateways. The one or more instructions, that when executed by a processor, cause the processor to perform one or more operations including the steps of the methods described above.

The above-described network device(s) or electronic apparatus(es), such as a target source, a VPN management device, an access point device, an extender access point device, a client device, and any other network devices, may be implemented as any of a residential network access point device, an electronic device (for example, a server, a mobile phone, a computing device such as a notebook computer, or both) according to some example embodiments.

Thus, according to various aspects of the present disclosure described herein, it is possible to automatically switch a VPN connection associated with a client device from an original VPN gateway to a different VPN gateway to enhance the network performance and/or QoE of a user.

BRIEF DESCRIPTION OF DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1A:
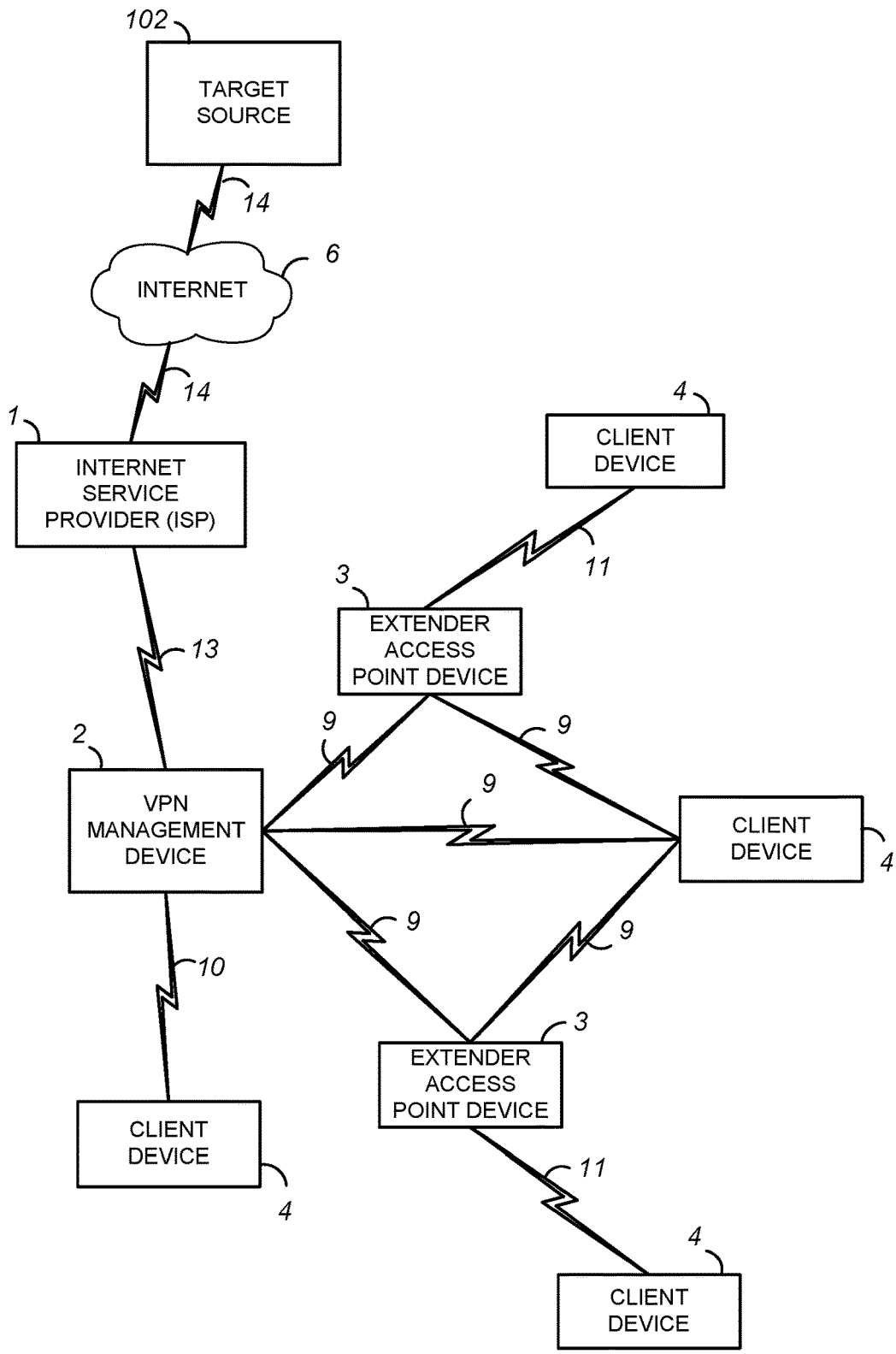
FIG. 1A is a schematic diagram of a network environment, according to one or more aspects of the present disclosure.

FIG. 1A is a schematic diagram of a network environment 100A, according to one or more aspects of the present disclosure.

It should be appreciated that various example embodiments of inventive concepts disclosed herein are not limited to specific numbers or combinations of devices, and there may be one or multiple of some of the aforementioned electronic apparatuses or network devices in the network environment, which may itself consist of multiple communication networks and various known or future developed wireless connectivity technologies, protocols, devices, and the like.

As shown in FIG. 1A, the main elements of the network environment 100A include a network comprising a VPN management device 2 connected to a target source 102 via Internet or WAN 6, for example, by connecting to an Internet Service Provider (ISP) 1. VPN management device 2 can also be connected to different wireless devices and/or network devices such as one or more wireless extender access point devices 3, one or more client devices 4, or both. The network environment 100A shown in FIG. 1A includes wired and/or wireless network devices (e.g., extender access point devices 3 and client devices 4) that may be connected in one or more wireless networks (e.g., private, guest, iControl, backhaul network, or Internet of things (IoT) network) within the network environment 100A. Additionally, there could be some overlap between network devices (e.g., extender access point devices 3 and client devices 4) in the different networks. That is, one or more network or wireless devices could be located in more than one network. For example, the extender access point devices 3 could be located both in a private network for providing content and information to a client device 4 and also included in a backhaul network or an iControl network.

The ISP 1 can be, for example, a content provider or any computer for connecting the VPN Management device 2 to the Internet 6, the target source 102, or both. For example, Internet 6 can be a cloud-based service that provides access to a target source 102. In one or more embodiments, target source 102 may be accessible via one or more VPN gateways located within or coupled to the target source 102 which allow for one or more VPN connections. The connections 14 between the Internet 6 and the ISP 1 and target source 102 and the connection 13 between the ISP 1 and the VPN management device 2 can be implemented using a WAN, a VPN, metropolitan area networks (MANs), system area networks (SANs), a data over cable service interface specification (DOCSIS) network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G, 5G, or 6G network, for example.

The connection 13 can further include as some portion thereof a broadband mobile phone network connection, an optical network connection, or other similar connections. For example, the connection 13 can also be implemented using a fixed wireless connection that operates in accordance with, but is not limited to, 3rd Generation Partnership Project (3GPP) Long Term Evolution (LTE), 5G, or 6G protocols. It is also contemplated by the present disclosure that connection 13 is capable of providing connections between the VPN management device 2 and a wireless area network (WAN), a local area network (LAN), a VPN, a MAN, a personal area network (PAN), a wireless local area network (WLAN), a SAN, a DOCSIS network, a fiber optics network (e.g., FTTH, FTTX, or HFC), a PSDN, a global Telex network, or a 2G, 3G, 4G, 5G or 6G network, for example.

The VPN management device 2 can comprise, for example, an access point and/or a hardware electronic device that may be a combination modem and gateway that combines the functions of a modem, an access point (AP), a router, a network switch, a gateway, a Wi-Fi hotspot device, any other suitable network device, and/or any combination thereof for providing data and/or traffic received from the target source 102 via ISP 1 to one or more network devices (e.g., wireless extender access point devices 3 and client devices 4) in the network environment 100A. In one or more embodiments, the VPN management device 2 is included within or part of any of a client device 4, a remote server (as discussed with reference to FIG. 1A, one or more network devices, or any combination thereof. It is also contemplated by the present disclosure that the VPN management device 2 can include the function of, but is not limited to, a universal plug and play (UPnP) simple network management protocol (SNMP), an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content. The VPN management device 2 may also be referred to as a router, server, residential gateway, a home network gateway, or a wireless access point (AP), and any combination thereof. The VPN management device 2 can provide access to a target source 102 by the one or more client devices via a VPN connection.

The connection 9 between the VPN management device 2, the wireless extender access point devices 3, and client devices 4 can be implemented using any of a wired connection, a wireless connection in accordance with any IEEE 802.11 Wi-Fi protocols, Bluetooth protocols, BLE, or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz bands, or 60 GHz bands, or any combination thereof. Additionally, the connection 9 can be implemented using a wireless connection that operates in accordance with, but is not limited to, RF 4CE protocol, ZigBee protocol, Z-Wave protocol, IEEE 802.15.4 protocol, any other protocol, or any combination thereof. It is also contemplated by the present disclosure that the connection 9 can include connections to a media over coax (MoCA) network. One or more of the connections 9 can also be a wired Ethernet connection. Any one or more of connections 9 can carry information on any of one or more channels that are available for use.

The extender access point devices 3 can be, for example, wireless hardware electronic devices such as access points (APs), extenders, repeaters, etc. used to extend the wireless network by receiving the signals transmitted by the VPN management device 2 and rebroadcasting the signals to, for example, client devices 4, which may be out of range of the access point device 2. The extender access point devices 3 can also receive signals from the client devices 4 and rebroadcast the signals to the VPN management device 2, or other client devices 4.

The connection 11 between the extender access point devices 3 and the client devices 4 are implemented through a wireless connection that operates in accordance with any IEEE 802.11 Wi-Fi protocols, Bluetooth protocols, Bluetooth low energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 60 GHz bands. Additionally, the connection 11 can be implemented using a wireless connection that operates in accordance with, but is not limited to, RF4CE protocol, ZigBee protocol, Z-Wave protocol, IEEE 802.15.4 protocol, any other protocol, or any combination thereof. Also, one or more of the connections 11 can be a wired Ethernet connection. Any one or more connections 11 can carry information on any one or more channels that are available for use.

The client devices 4 can be, for example, hand-held computing devices, personal computers, electronic tablets, mobile phones, smart phones, smart speakers, Internet-of-Things (IoT) devices, iControl devices, portable music players with smart capabilities capable of connecting to the Internet, cellular networks, and interconnecting with other devices via any of a wired connection, Wi-Fi, Bluetooth, and any combination thereof, or other wireless hand-held consumer electronic devices capable of accessing a wireless network. For example, any one or more client devices 4 can be a mobile network device capable of connecting to a wireless network and provisioning the VPN management device 2 to provide a 6 GHz wireless frequency band network. Additionally, any one or more client devices 4 can be a television (TV), an IP/QAM set-top box (STB) or a streaming media decoder that is capable of decoding audio/video content, and playing over OTT or MSO provided content received through the VPN management device 2.

The connection 10 between the VPN management device 2 and the client device 4 can be implemented through a wired connection, a wireless connection that operates in accordance with, but is not limited to, any IEEE 802.11 protocols, or both. Additionally, the connection 10 between the VPN management device 2 and the client device 4 can also be implemented through a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G, 6G, or 5G network, for example. The connection 10 can also be implemented using a wireless connection in accordance with Bluetooth protocols, BLE, or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. One or more of the connections 10 can also be a wired Ethernet connection.

Figure 1B:
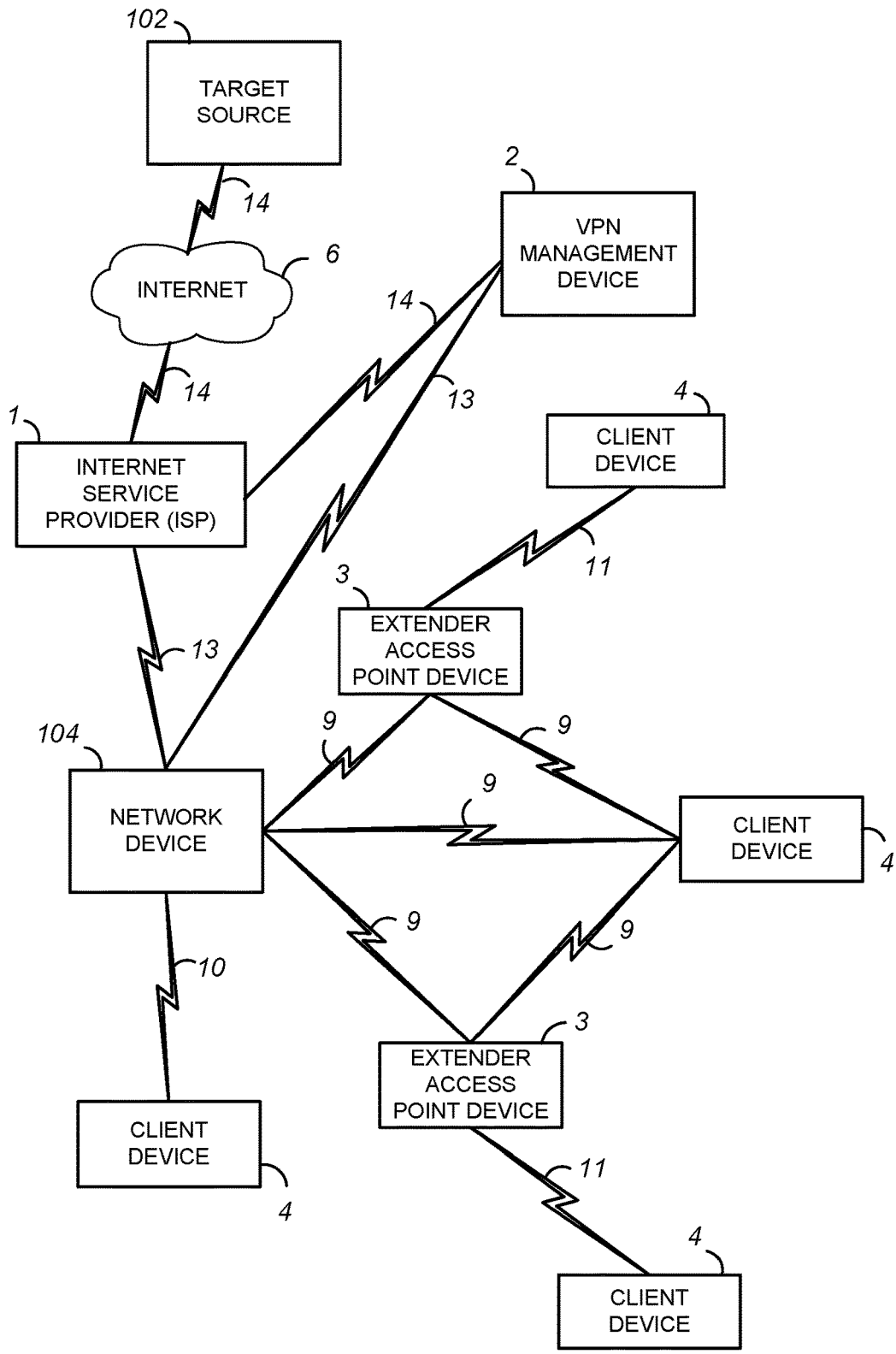
FIG. 1B is a schematic diagram of a network environment, according to one or more aspects of the present disclosure.
Figure 2:
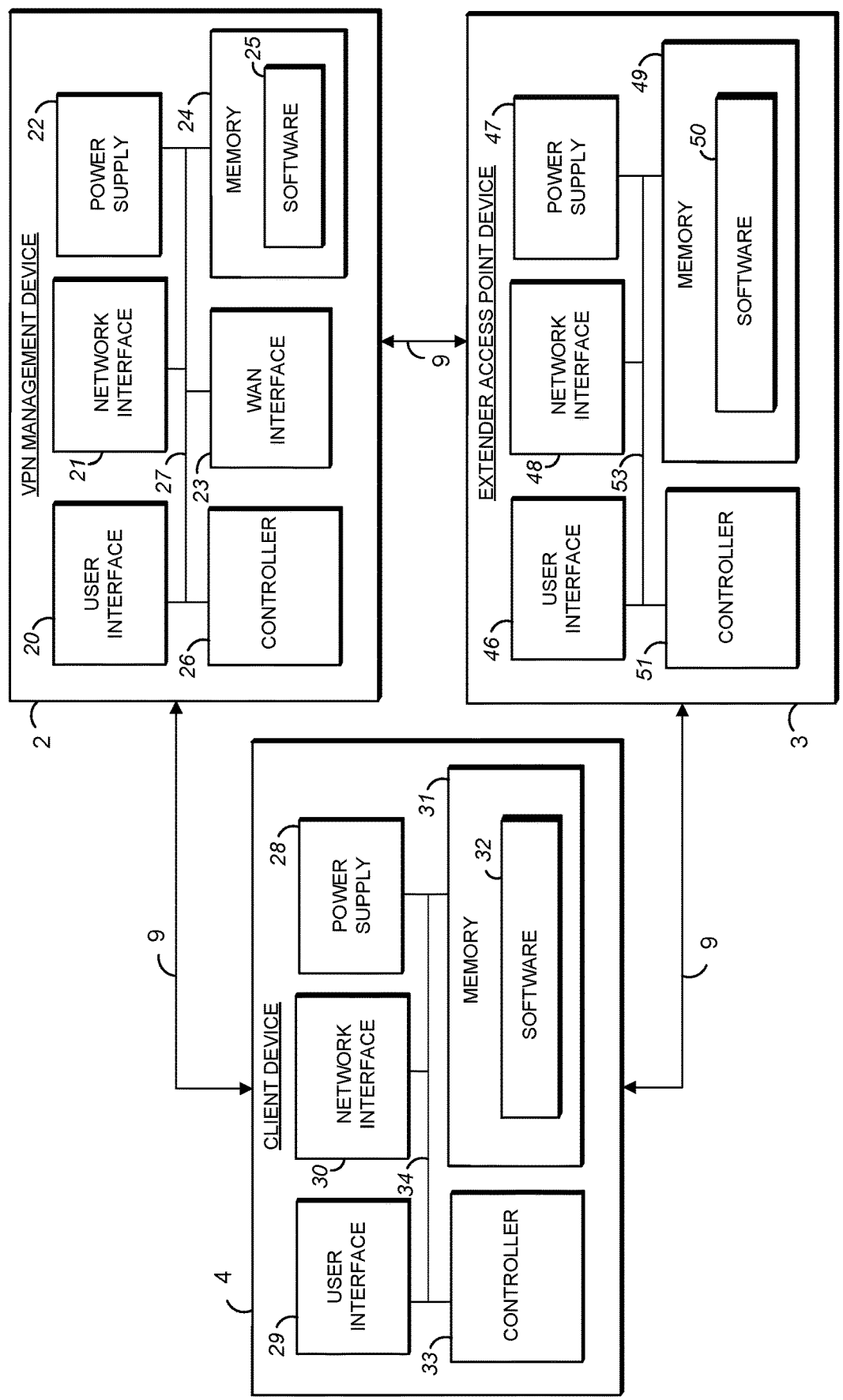
FIG. 2 is a more detailed block diagram illustrating various components of an exemplary VPN management device, client device, and extender access point device implemented in a network environment of FIG. 1A and/or FIG. 1B, according to one or more aspects of the present disclosure.

A detailed description of the exemplary internal components of the VPN management device 2, the extender access point devices 3, and the client devices 4 shown in FIG. 1A and/or FIG. 1B will be provided in the discussion of FIG. 2. However, in general, it is contemplated by the present disclosure that the VPN management device 2, the extender access point devices 3, and the client devices 4 include electronic components or electronic computing devices operable to receive, transmit, process, store, and/or manage data and information associated with the network environment 100A, which encompasses any suitable processing device adapted to perform computing tasks consistent with the execution of computer-readable instructions stored in a memory or a computer-readable recording medium (e.g., a non-transitory computer-readable medium).

Further, any, all, or some of the computing components in the VPN management device 2, the extender access point devices 3, and the client devices 4 may be adapted to execute any operating system, including Linux, UNIX, Windows, MacOS, DOS, and ChromOS as well as virtual machines adapted to virtualize execution of a particular operating system, including customized and proprietary operating systems. The VPN management device 2, the extender access point devices 3, and the client devices 4 are further equipped with components to facilitate communication with other computing devices or network devices over the one or more network connections to local and wide area networks, wireless and wired networks, public and private networks, and any other communication network enabling communication in the network environment 100A.

FIG. 1B is a schematic diagram of a network environment 100B, according to one or more aspects of the present disclosure. The various elements and connections of FIG. 1B are similar to or the same as those of FIG. 1A except that the VPN management device 2 is located remote from the extender access point devices 3 and the client devices 4. The network device 104 can comprise, for example, a residential gateway, an access point and/or a hardware electronic device that may be a combination modem and gateway that combines the functions of a modem, an access point (AP), and/or a router for providing content received from the ISP 1 to one or more network devices (e.g., wireless extender access point devices 3 and client devices 4) in the network environment 100B. In one or more embodiments, the network device 104 is a client device 4 configured to connect to any of an ISP 1, a VPN management device 2, any other network devices, or a combination thereof. The functionality of the VPN management device 2 of FIG. 1B is the same as that of FIG. 1A except that the VPN management device 2 connects to ISP 1 via connection 14 and/or to network device 104 via connection 13. For example, the VPN management device 2 can connect to the one or more extender access point devices 3 and client devices 4 via a network device 104 and/or via ISP 1 to a network device 104.

FIG. 2 is a more detailed block diagram illustrating various components of an exemplary access point device, client device, and wireless extender implemented in the network environment 100 of FIG. 1, according to one or more aspects of the present disclosure.

Although FIG. 2 only shows one extender access point device 3 and one client device 4, the extender access point device 3 and the client device 4 shown in the figure are meant to be representative of the other extender access point devices 3 and client devices 4 of a network system, for example, network environment 100A and/or 100B shown in FIG. 1 and/or FIG. 1B, respectively. Similarly, the connections 9 between the VPN management device 2, the extender access point device 3, and the client device 4 shown in FIG. 2 are meant to be exemplary connections and are not meant to indicate all possible connections between the access point devices 2, extender access point devices 3, and client devices 4. Additionally, it is contemplated by the present disclosure that the number of VPN management devices 2, extender access point devices 3, and client devices 4 is not limited to the number of access point devices 2, extender access point devices 3, and client devices 4 shown in FIGS. 1A, 1B and 2.

The client device 4 includes a power supply 28, a user interface 29, a network interface 30, a memory 31, and a controller 33. The power supply 28 supplies power to the internal components of the client device 4 through the internal bus 34. The power supply 28 can be a self-contained power source such as a battery pack with an interface to be powered through an electrical charger connected to an outlet (e.g., either directly or by way of another device). The power supply 28 can also include a rechargeable battery that can be detached allowing for replacement such as a nickel-cadmium (NiCd), nickel metal hydride (NiMH), a lithium-ion (Li-ion), or a lithium Polymer (Li-pol) battery. The user interface 29 includes, but is not limited to, push buttons, a keyboard, a keypad, a liquid crystal display (LCD), a thin film transistor (TFT), a light-emitting diode (LED), a high definition (HD) or other similar display device including a display device having touch screen capabilities so as to allow interaction between a user and the client device 4, for example, so as to connect to a VPN gateway via a VPN connection, as discussed with reference to FIGS. 3-5. In one or more embodiments, user interface 29 provides an interface for a user, such as a graphical user interface, to select a VPN gateway. The network interface 30 can include, but is not limited to, various network cards, interfaces, and circuitry implemented in software and/or hardware to enable communications with the VPN management device 2, the extender access point device 3, ISP 1, Internet 6, target source 102 using any one or more of the communication protocols in accordance with connection 9 (e.g., as described with reference to FIG. 1A and/or FIG. 1B).

The memory 31 includes a single memory, one or more memories, or one or more memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 31 can be used to store any type of instructions, software, or algorithms including software 32 for controlling the general function and operations of the client device 4 in accordance with the embodiments described in the present disclosure. In one or more embodiments, software 32 can be VPN client software that provides for a connection to the VPN management device 2 so as to access data, resources, and/or services via a VPN connection to a VPN gateway of the of the target source 102. Memory 31 can store the VPN client software and information.

The controller 33 controls the general operations of the client device 4 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software including the software 32 for controlling the operation and functions of the client device 4 in accordance with the embodiments described in the present disclosure, such as provisioning access point device 2. Communication between the components (e.g., 28-31 and 33) of the client device 4 may be established using an internal bus 34.

The extender access point device 3 can be, for example, any wireless hardware electronic device used to extend a wireless network by receiving the signals transmitted by the VPN management device 2 and rebroadcasting the signals to any one or more client devices 4, which may be out of range of the access point device 2 including, but not limited to, a wireless extender, a repeater, and/or an access point. The extender access point device 3 can also receive signals from any one or more of the client devices 4 and rebroadcast the signals to the access point device 2 or any other one or more client devices 4. In one or more embodiments, the VPN management device 2 is replaced with a network device 104 and the VPN management device 2 is remote from the extender access point device 3 and the client device 4.

As shown in FIG. 2, the extender access point device 3 includes a user interface 46, a power supply 47, a network interface 48, a memory 49, and a controller 51. The user interface 46 can include, but is not limited to, one or more push buttons, a keyboard, a keypad, an LCD, a TFT, an LED, an HD or other similar display device including a display device having touch screen capabilities so as to allow interaction between a user and the extender access point device 3. The power supply 47 supplies power to the internal components of the wireless extender access point device 3 through the internal bus 53. The power supply 47 can be connected to an electrical outlet (e.g., either directly or indirectly by way of another device) via a cable or wire. The network interface 48 can include various network cards, interfaces, and circuitry implemented in software and/or hardware to enable communications with the client device 4 and the VPN management device 2 using the communication protocols in accordance with connection 9 (e.g., as described with reference to FIG. 1). For example, the network interface 48 can include multiple radios or sets of radios (e.g., a 2.4 GHz radio, one or more 5 GHz radios, and/or a 6 GHz radio), which may also be referred to as WLAN interfaces. One radio or set of radios (e.g., 5 GHz and/or 6 GHz radio(s)) provides a backhaul connection between the wireless extender access point device 3 and the access point device 2, and optionally other wireless extender access point device(s) 3. Another radio or set of radios (e.g., 2.4 GHz, 5 GHz, and/or 6 GHz radio(s)) provides a fronthaul connection between the extender access point device 3 and one or more client device(s) 4.

The memory 49 can include a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy. The memory 49 can be used to store any type of instructions, software, or algorithm including software 50 associated with controlling the general functions and operations of the wireless extender access point device 3 in accordance with the embodiments described in the present disclosure. In one or more embodiments, extender access point device 3 is a network device and software 50 includes one or more instructions for establishing a connection with the VPN management device 2, the network device 104, and/or a client device 4. The controller 51 controls the general operations of the wireless extender access point device 3 and can include, but is not limited to, a CPU, a hardware microprocessor, a hardware processor, a multi-core processor, a single core processor, an FPGA, a microcontroller, an ASIC, a digital signal processor (DSP), or other similar processing device capable of executing any type of instructions, algorithms, or software for controlling the operation and functions of the wireless extender access point device 3 in accordance with the embodiments described in the present disclosure. General communication between the components (e.g., 46-51) of the extender access point device 3 may be established using the internal bus 53.

The VPN management device 2 can be, for example, a hardware electronic device that can combine one or more functions of any of a modem, a gateway, an access point (AP), a router, or combinations thereof for providing a VPN connection between network or wireless devices (e.g., extender access point devices 3, client devices 4) in the system to a VPN gateway of a target source 102. Besides providing a VPN connection, the VPN management device 2 can also provide the functionality of an IP/QAM STB, an SMD, or any other decoder that is capable of decoding audio/video content, and playing OTT or MSO provided content.

As shown in FIG. 2, the VPN management device 2 includes a user interface 20, a network interface 21, a power supply 22, a wide area network (WAN) interface 23, a memory 24, and a controller 26. The user interface 20 can include, but is not limited to, one or more push buttons, a keyboard, a keypad, an LCD, a TFT, an LED, an HD or other similar display device including a display device having touch screen capabilities so as to allow interaction between a user and the VPN management device 2. In one or more embodiments, the user interface 20 provides an interface, such as a command-line interface, a graphical user interface, an interface output port for connection to a display, and/or any other type of user interface.

The network interface 21 may include various network cards, and circuitry implemented in software and/or hardware to enable communications with the extender access point device 3 and the client device 4 using the communication protocols in accordance with connection 9 (e.g., as described with reference to FIG. 1). Additionally, the various network cards, interfaces, and circuitry of the network interface 21 enable communications with a client device 4 (e.g., a mobile device) using the one or more communication protocols in accordance with connection 10 (e.g., as described with reference to FIG. 1). For example, the network interface 21 can include an Ethernet port (also referred to as a LAN interface) and multiple radios or sets of radios (e.g., a 2.4 GHz radio, one or more 5 GHz radios, and/or a 6 GHz radio, also referred to as WLAN interfaces). One radio or set of radios (e.g., 5 GHz and/or 6 GHz radio(s)) provides a backhaul connection between the VPN management device 2 and the wireless extender access point device(s) 3. Another radio or set of radios (e.g., 2.4 GHz, 5 GHz, and/or 6 GHz radio(s)) provides a fronthaul connection between the access point device 2 and one or more client device(s) 4. In one or more embodiments, the network interface 21 interfaces with a VPN gateway of the target source 102.

The power supply 22 supplies power to the internal components of the access point device 2 through the internal bus 27. The power supply 22 can be connected to an electrical outlet (e.g., either directly or by way of another device) via a cable or wire. The wide area network (WAN) interface 23 may include various network cards, and circuitry implemented in software and/or hardware to enable communications between the VPN management device 2 and the ISP 1 using the wired and/or wireless protocols in accordance with connection 13 (e.g., as described with reference to FIG. 1).

The memory 24 includes a single memory, one or more memories, or one or more memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be a non-transitory computer-readable storage medium used to store any type of instructions, software, or algorithm including software 25 for providing a VPN connection to a VPN gateway of the target source 102 such that any one or more client devices 4 can access one or more data, resources and/or services associated with the target source 102 via the VPN connection. In one or more embodiments, memory 24 comprises one or more elements as discussed with reference to FIG. 6.

Figure 6:
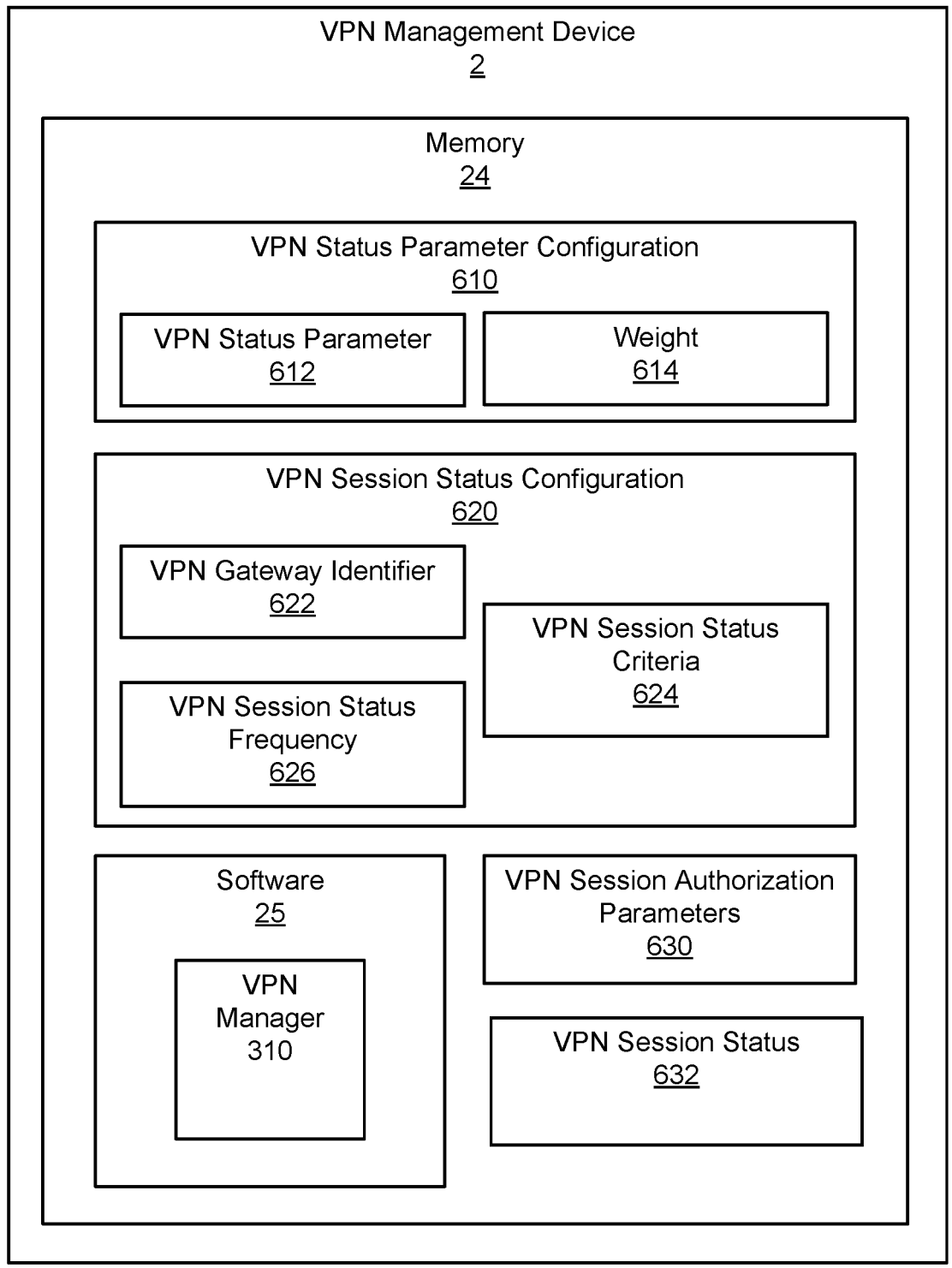
FIG. 6 is an illustration of one or more components of a VPN management device, according to one or more embodiments of the present disclosure.

FIG. 6 illustrates one or more components of a VPN management device 2, in particular, memory 4, according to one or more embodiments of the present disclosure. The VPN management device 2 can comprise a memory 24. Memory 24 can comprise one or more storage locations for storing one or more variables and/or values associated with a software 25, such as those discussed with respect to a VPN manager 310 in reference to FIG. 3. For example, memory 24 can include one or more VPN session authorization parameters 630, a VPN status parameter configuration 610 (for example, TABLE 1) and a VPN session status configuration 620 (for example, TABLE 2) as discussed with reference to FIG. 3. VPN status parameter configuration 610 and VPN session status configuration 620 can comprise a database, a data structure, a flat-file system, any other storage medium, or any combination thereof. VPN status parameter configuration 610 can include a VPN status parameter 612 and a weight 614 associated with the VPN status parameter 612. VPN session status configuration 620 can include a VPN gateway identifier 622, a VPN session status criteria 624 associated with the VPN gateway identifier 622, and a VPN session status frequency 626 associated with the VPN session status criteria 624. In one or more embodiments, any one or more elements of the VPN status parameter configuration 610 and/or the VPN session status configuration 620 are customizable, for example, by a user, such as a representative of an employer or other entity, a superuser, an information technology specialist, any other type of user, or any combination thereof. In one or more embodiments, a VPN session status 632 can be determined and/or stored based on a VPN status parameter configuration 610, for example.

The controller 26 controls the general operations of the VPN management device 2 as well as connectivity to the network by one or more other network devices (wireless extender access point devices 3 and client device 4). The controller 26 can include, but is not limited to, a central processing unit (CPU), a network controller, a hardware microprocessor, a hardware processor, a multi-core processor, a single core processor, a FPGA, a microcontroller, an ASIC, a DSP, or other similar processing device capable of executing any type of instructions, algorithms, or software including the software 25 in accordance with the embodiments described in the present disclosure. Communication between the components (e.g., 20-24, and 26) of the access point device 2 may be established using the internal bus 27. The controller 26 may also be referred to as a processor, generally.

Figure 3:
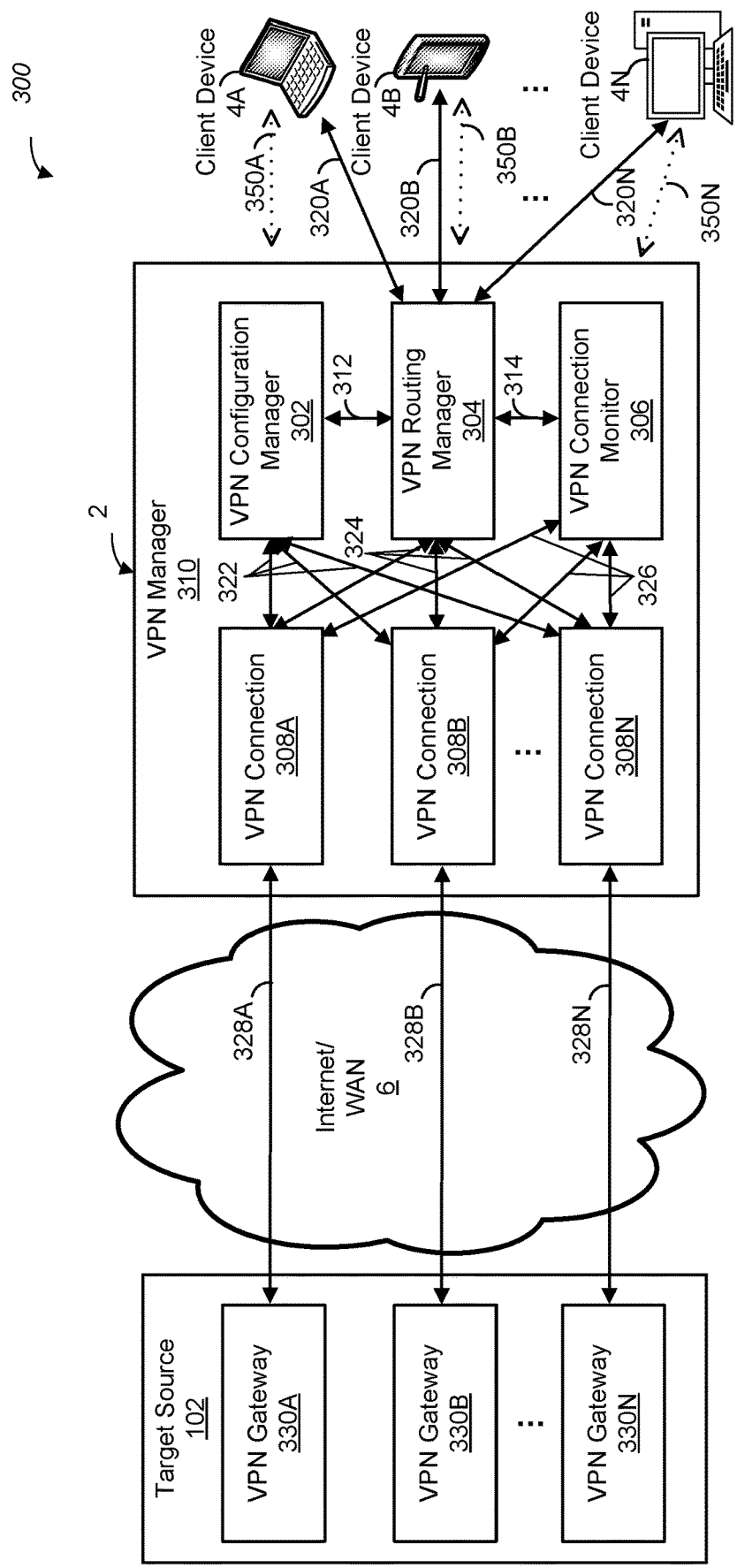
FIG. 3 is a block diagram illustrating various connections between a client device and a target source utilizing a VPN manager, according to one or more aspects of the present disclosure.

FIG. 3 is a block diagram illustrating various connections between a client device 4 and a target source 102 utilizing a VPN manager 310 of a VPN management device 2, for example, a network environment 300 that is similar to or the same as a network environment 100A or 100B of FIG. 1A or FIG. 1B, respectively, according to one or more aspects of the present disclosure.

The network environment 300 can include one or more client devices 4, for example, client devices 4A, 4B and 4N (collectively referred to as client device(s) 4), where N represents any number of client devices 4. Each client device 4 can connect to a VPN management device 2 as discussed with respect to FIGS. 1A, 1B and/or 2. Each client device 4 can be associated with a single user, different users, or a plurality of users. While FIG. 3 illustrates different types of client devices 4, such as a laptop (client device 4A), a smart phone (client device 4B), and a computer (client device 4N), the present disclosure contemplates that network environment 300 can include any one or more client devices 4 of any one or more types as discussed, for example, with respect to FIG. 1A, or a single client device 4.

The VPN management device 2 can comprise a VPN Manager 310 that manages, configures, establishes, monitors, and any combination thereof one or more VPN sessions 350 between a client device 4 and the target source 102. The VPN Manager 310 can comprise a VPN configuration manager 302, a VPN routing manager 304, a VPN connection monitor 306, and one or more VPN connections 308, such as VPN connections 308A, 308B, and 308N (collectively referred to as VPN connection(s) 308), where N represents any number of VPN connections 308. In one or more embodiment, the VPN manager 310 can be remotely managed, pre-configured, dynamically configured, or any combination thereof.

The VPN routing manager 304 can be coupled to the VPN configuration manager 302 and VPN connection monitor 306 via a connection 312 and a connection 314, respectively. The VPN configuration manager 304 configures any one or more VPN sessions 350 associated with any one or more client devices 4 such that data can be transmitted to and/or received from a corresponding VPN gateway 330. The VPN configuration manager 302 can access one or more VPN session authorization parameters 630, for example, from a memory 24. The one or more VPN session authorization parameters 630 can comprise any of a uniform resource location (URL), client device type, one or more auxiliary applications, one or more credentials, one or more authentication parameters, any other VPN session authorization parameters associated with a VPN session 350, or any combination thereof. In one or more embodiments, one or more VPN authorization parameters 630 can be associated with a keep alive function and/or such that the VPN manager 310 maintains or prevents expiration of any one or more VPN sessions 350 and/or corresponding VPN connections 308. The one or more VPN session authorization parameters 630 can be utilized by the VPN configuration manager 302 to establish one or more VPN connections 308. For example, the VPN configuration manager 302 can utilize the one or more VPN session authorization parameters to accommodate one or more configuration options of a client device 4. The VPN configuration manager 302 can send and receive data to the one or more VPN connections 308 via one or more paths 322. For example, the VPN configuration manager 302 can provide to the VPN connection 308 via the path 322 any required one or more VPN session authorization parameters 630 such that encrypted data or traffic 328 can be transmitted to and/or received from a VPN gateway 330. In one or more embodiments, the VPN configuration manager 302 is a secure remote server such that the VPN manager 310 can configure a VPN connection 308 between the client device 4 and a remote resource or network as the target source, for example, an Internet address across a regional border.

The VPN Routing Manager 304 receives requests from one or more client devices 4 to establish one or more VPN sessions 350 and routes data and/or traffic from the one or more client devices 4 to an associated VPN connection 308 and routes data and/or traffic from the one or more VPN connections 308 to the associated one or more client devices 4. For example, client devices 4A, 4B, and 4N can be connected to the VPN routing manager via one or more connections 320A, 320B, and 320N (collectively referred to as connection(s) 320), respectively, and can be associated with VPN sessions 350A, 350B, and 350N (collectively referred to as connection(s) 350), respectively. The one or more connections 320 can be the same as or similar to any one or more connections discussed with reference to FIGS. 1A and 1B. The VPN routing manager 304 can send a command to the VPN configuration manager 302 via path 312 for the VPN configuration manager to establish one or more VPN connections 308A, 308B, and/or 308N (collectively referred to as VPN connection(s) 308, where N represents any number of VPN connections 308) to a corresponding VPN gateway 330A, 330B and/or 330N (collectively referred to as VPN gateway(s) 330, where N represents any number of VPN gateways 330), respectively, for an associated VPN session 350. Any one or more VPN sessions 350 and/or one or more VPN connections 308 can be based on a VPN status parameter 612 associated with a VPN connection 308, a VPN gateway 330, or both. The VPN routing manager 304 routes data and/or traffic received from a client device 4 to a corresponding VPN connection 308 for transmission as encrypted data 328 to an associated gateway 330. Similarly, the VPN routing manager 304 routes data and/or traffic received from a VPN gateway 330 as encrypted data 328 to a corresponding VPN connection 308 to the associated client device 4. For example, the VPN Routing manager 304 can request that the VPN configuration manager 302 establish a VPN connection 308A to VPN gateway 330A, a VPN connection 308B to VPN gateway 330B, and/or a VPN connection 308N to VPN gateway 330N such that encrypted data and/or traffic 328A, 328B and/or 328N, respectively, can be transmitted over Internet 6 between the one or more VPN gateways 330 and the associated one or more VPN connections 308.

The VPN connection monitor 306 monitors one or more VPN status parameters 612 associated with a VPN session 350 via paths 326 to the one or more VPN connections 308. The VPN connection monitor 306 can transmit the one or more VPN status parameters 612 to the VPN routing manager 304 via path 314 based on a time parameter, such as any of routinely, periodically, at timed intervals, randomly, any other time parameter, or any combination thereof. In one or more embodiments, the VPN routing manager 304 can any of routinely, periodically, at timed intervals, randomly, any other time variable, and any combination thereof, request the one or more VPN status parameters 612 associated with a VPN session 350 from the VPN connection monitor 306. The VPN routing manager 304 can utilize the one or more VPN status parameters 612 to determine selection of a VPN connection 308 for associating with any particular VPN session 350 such that the VPN connection 308 associated with any VPN session 350 can be switch to a different VPN connection 308. The one or more VPN status parameters 612 can be configurable via a user interface 20 of the VPN management device 2, a user interface 29, or any combination thereof. In one or more embodiments, any of the one or more VPN status parameters 612 can be associated with a weight or priority 614. For example, the weight 614 associated with a VPN status parameter 612 can be different based on a given VPN session 350. One or more VPN status parameters 612 can comprise any one or more network connection parameters, one or more factors associated with a type of data, a type of client device 4, a resource, and/or a service to be accessed, one or more laws, restrictions, regulations, or other access tax, location of a client device, ISP 1, access management device 2, or any other network device associated with the client device, or any combination thereof, type of data encryption, one or more security requirements, any other one or more factors, or any combination thereof. For example, TABLE 1 illustrates a VPN status parameter configuration 610 that has been customized such that each VPN status parameter 612 (P) has a corresponding weight 614 (W). In one or more embodiments, the weight or priority 614 can comprise any numerical value, such as a whole number, a decimal value, or any other numerical representation. In one or more embodiments, the VPN routing manager 304 can determine the VPN connection 308 to select for a given VPN session 350 associated with a client device 4 based on a VPN session status criteria 624 associated with any of the one or more VPN connections 308. A VPN session status 632 can be determined for each VPN session 350 based on the VPN session status criteria 624. The VPN session status criteria 624 can comprise any of one or more VPN status parameters 612, such as any one or more of the VPN status parameters 612 listed in TABLE 1, one or more selection algorithms, or both. A selection algorithm can comprise a summation of any one or more VPN status parameters 612, any one or more VPN status parameters 612 weighted by an associated weight 614, a cost function that utilizes any one or more VPN status parameters 612 and/or one or more associated weights 614, a load balancing function, an optimization algorithm that utilizes any one or more VPN status parameters 612 and/or one or more associated weights 614, any other selection algorithm or any combination thereof. The VPN routing manager 304 can automatically or seamless switch the present and/or initial VPN connection 308 associated with a VPN session 350 for a client device 4 to a different VPN connection based on a VPN session status 632 associated with a VPN session 350 and/or a VPN gateway 330.

TABLE 1

VPN Status Parameter Configuration.

| | VPN STATUS PARAMETER (P) | WEIGHT/ PRIORITY (W) |
|---|---|---|
| 1 | Connection state of a VPN session 350 and/or VPN connection 308 | $W_1$ |
| 2 | Ping speed associated with a VPN connection 308 | $W_2$ |
| 3 | Speed test associated with a VPN connection 308 | $W_3$ |
| 4 | Throughput rate associated with a VPN connection 308 | $W_4$ |
| 5 | Latency associated with a VPN connection 308 | $W_5$ |
| 6 | Type of traffic based on packet inspection/Type of data associated with a client device 4 (such as data associated with one or more data privacy restrictions, rules, or laws, encrypted data, financial data, health data, etc.) | $W_6$ |
| 7 | Location of VPN gateway 330 | $W_7$ |
| 8 | Encryption type | $W_8$ |
| 9 | Bandwidth associated with a VPN connection 308 | $W_9$ |
| 10 | Data privacy regulations | $W_{10}$ |
| 11 | Load balancing | $W_{11}$ |
| 12 | Connection type (e.g., HTTP, SSH, etc.) | $W_{12}$ |
| N | <additional VPN status parameter> | $W_N$ |

Selection Algorithm=$\sum_{i=1}^{N} P_i W_i$  EQUATION 1, where N represents any value.

For example, a client devices 4A, 4B, and 4C can be utilized by one or more users within a home network environment that has a subscription to a VPN service at target source 102. Each client device 4 may be associated with a different type of traffic. A VPN status parameter configuration 610 can indicate that traffic from one or more client devices 4 is routed to a VPN connection 308 based on a type of traffic (such as the VPN status parameter 612 at row 6 of TABLE 1). For example, the VPN status parameter 612 can indicate that traffic associated with a game or financial transaction is routed to the VPN connection 308 with the lowest latency, telephone audio is routed to the VPN connection 308 with the best quality of service (QoS), data transfer traffic is routed to the VPN connection 308 with the highest throughput. In this way, the traffic associated with a client device 4 is routed by the VPN manager 310 to the VPN connection 308 that provides an efficient use of network resources and/or QoE for an associated user.

In one or more embodiments, the VPN routing manager 304 can determine the VPN connection 308 for selection based on a customized VPN session status 632. For example, a user, a system administrator, any other authorized operator, or any combination thereof can configure the VPN routing manager 304 to utilize any combination of one or more VPN status parameters 612, one or more weights 614, one or more VPN session status criteria 624, any other factor, or any combination thereof to determine the VPN connection 308 for selection. For example, TABLE 2 illustrates a customized VPN session status configuration 620 associated with a VPN session 350, such as a VPN session 350 corresponding to a VPN connection 308 to a VPN gateway 330. Each VPN gateway 330 is associated with a VPN gateway identifier 622 that corresponds to a VPN session status criteria 624. In one or more embodiments, any of the one or more VPN status parameters 612, a corresponding weight 614, or both can be customized as a VPN status parameter configuration 610. In one or more embodiments, any of the VPN gateway identifier 622, one or more corresponding session status frequency 626, one or more VPN session status criteria 624, or any combination thereof can be customized as a VPN session status configuration 620. For example, any one or more of the customizations illustrated in TABLE 1 and/or TABLE 2 can be configured and/or created utilizing a user interface, such as one that provides local access or remote console access, at any one or more network devices, including, but not limited to, any of a VPN management device 2, a client device 4, a network device connected to ISP 1 any other network device, or a combination thereof.

TABLE 2

VPN Session Status Configuration.

| VPN Gateway Identifier (associated with a VPN Connection) | VPN Session Status Criteria | VPN Session Status Frequency |
|---|---|---|
| 1 <VPN Gateway 330A/VPN connection 308A> | <$P_1$> | <timed interval> |
| 2 <VPN Gateway 330B/VPN connection 308B> | <selection algorithm> | <network event> |
| 3 <VPN Gateway 330N/VPN connection 308N> | <$P_2$>,<$P_4$>,<$P_5$> | <timed interval> |

In one or more embodiments, the VPN manager 310 allows any one or more client devices 4 to connect via a VPN connection 308 to the same VPN gateway 330. In one or more embodiments, the VPN manager 310 comprises the VPN configuration manager 302, the VPN routing manager 304, and/or the VPN connection monitor 306 as contained in and/or part of a one or more software 25 or distributed between one or more network devices, such as one or more VPN management devices 2, one or more client devices 4, a remote server, any other network devices, or a combination thereof.

While FIG. 3 illustrates VPN gateways 330A-N located within or as part of a target source 102, the present disclosure contemplates that any one or more VPN gateways 330 may be located within or as part of one or more target sources 102. For example, an entity may distribute or replicate data across multiple locations such that a plurality of target sources 2 are disposed at a plurality of locations. A first target source 102 at a first location can comprise a VPN gateway 330A and a VPN gateway 330B while a second target source 102 at a second location can comprise a VPN gateway 330N. The first location and the second location can be different geological locations, such as different countries, states, cities, regions, etc.

Figure 4:
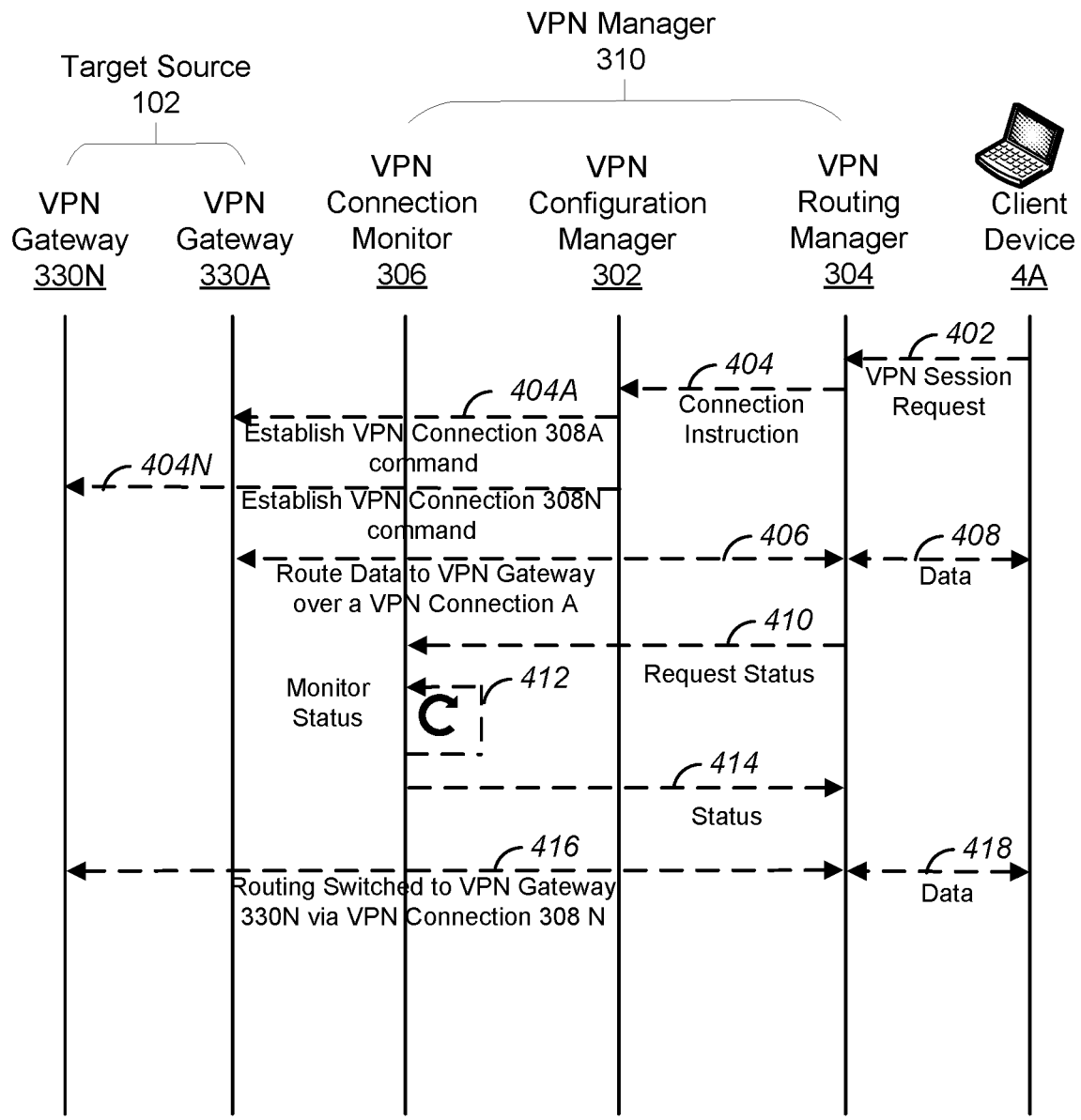
FIG. 4 is an illustration of switching a VPN connection to a VPN gateway utilizing a VPN manager, according to one or more aspects of the present disclosure.

FIG. 4 is an illustration of switching a VPN connection 308 to a VPN gateway 330 utilizing a VPN manager 310 that comprises a VPN routing manager 304, a VPN configuration manager 302, and a VPN connection monitor 306 as discussed in reference to FIG. 3, according to one or more aspect of the present disclosure. A client device 4A can be connected to a network, for example, a home network, a business network, or any other type of network, such as discussed with reference to network environment 100A and/or 100B of FIGS. 1A and 1B, respectively. The client device 4A can send a request 402 to VPN routing Manager 304 that a VPN session 350 be established. For example, a user of client device 4A may require that data be sent to and/or received from a target source 102 that is remote from the client device 4A. The user may require that such data be communicated securely via a VPN session 350 established with one or more network devices of the target source 102, for example, one or more VPN gateways 330.

The VPN routing manager 304 can send a connection instruction 404 to the VPN manager 302 based on the VPN session request 402. In one or more embodiments, the VPN configuration manager 302 establish a VPN connection 308A associated with the VPN session request 402 by sending a command 404A to the VPN gateway 330 A so as to establish a VPN connection 308A. In one or more embodiments, the VPN routing manager 304 can send one or more authentication parameters to the VPN routing manager 304 so that the VPN routing manager 304 can establish a VPN connection 308A associated with the VPN session request 402. The VPN configuration manager 302 (and/or the VPN routing manager 304) can also send a command 404N to the VPN gateway 330 N to establish a VPN connection 308N. Once the VPN connection 308A is established, the VPN routing manager 304 can route data and/or traffic 408 received from the client device 4A and/or the VPN gateway 330A to the associated VPN gateway 330A and/or client device 4A, respectively.

During the VPN session associated with the VPN connection 308A, the VPN routing manager 304 requests a status associated with the VPN session, any one or more VPN connections 308, or both based on a status monitor configuration associated with the VPN session, a VPN connection 308, a monitor setting, such as a monitor setting associated with a client device 4, a network environment, a user, any other factor, or a combination thereof. In one or more embodiments, the status monitor configuration is stored in a memory 24 of the VPN management device 2, any other memory accessible by the VPN manager 310, or both. For example, the status monitor configuration can indicate that the VPN routing manager 304 request a status 410 based on a VPN session status frequency 626. The VPN session status frequency 626 can indicate that VPN session status 632 should be monitored any of routinely, periodically, at a timed interval, upon a command, such as from another application or program, semaphore, interrupt, and/or expiration of a timer, occurrence of a network event (including, but not limited to, a disconnection of a VPN connection 308, a power interruption, such as a power off or power on event, a data usage threshold, a signal strength threshold, new VPN connection 308, etc.), any other frequency, or any combination thereof. For example, any of a user, entity, and/or any other program or interface, can request that VPN routing manager 304 can send a request status 410 to the VPN connection monitor 306. As discussed with reference to FIG. 3, the status can be based on one or more VPN status parameters. In one or more embodiments, the VPN connection monitor 306 can continuously monitor status 412 as required, for example, by the status monitor configuration. Based on the monitor status 412, the request status 410, or both, the VPN connection monitor can send a status 414 to the VPN routing manager 304.

The VPN routing manager 304 can determine a VPN session status 632 for a VPN session 350. For example, a first VPN session 350 can be associated with a VPN connection 308A to a VPN gateway 330A as illustrated in FIG. 4. The VPN session status 632 can be based on the status 414 received from the VPN connection monitor 306. In one or more embodiments, the status 414 can comprise any one or more VPN status parameters 612 as discussed with reference to FIG. 3. The VPN routing manager 304 can determine the VPN connection 308, for example, so as to provide an improved or enhanced connectivity experience, based on any one or more criteria, such as a value stored as part of the status monitor configuration. For example, the VPN status parameter configuration 610 can indicate that the VPN session status 632 is determined based on any of one or more VPN status parameters, one or more selection algorithms, one or more network parameters, any other factor, or any combination thereof. In one or more embodiments, the VPN connection monitor 306 sends the VPN session status 632 as part of the status 414.

Based on the VPN session status 632, the VPN routing manager 304 selects a VPN connection 308 for continuing the VPN session 350 established for the client device 4A. The VPN routing manager 304 can perform a routing switch 416 such that data and/or traffic 418 is routed to the switched or selected VPN gateway 330N via an associated VPN connection 308N. In this way, the VPN session can be automatically and/or seamlessly switched to between VPN connections 308 so that the user has an enhanced or improved QoE.

Figure 5A:
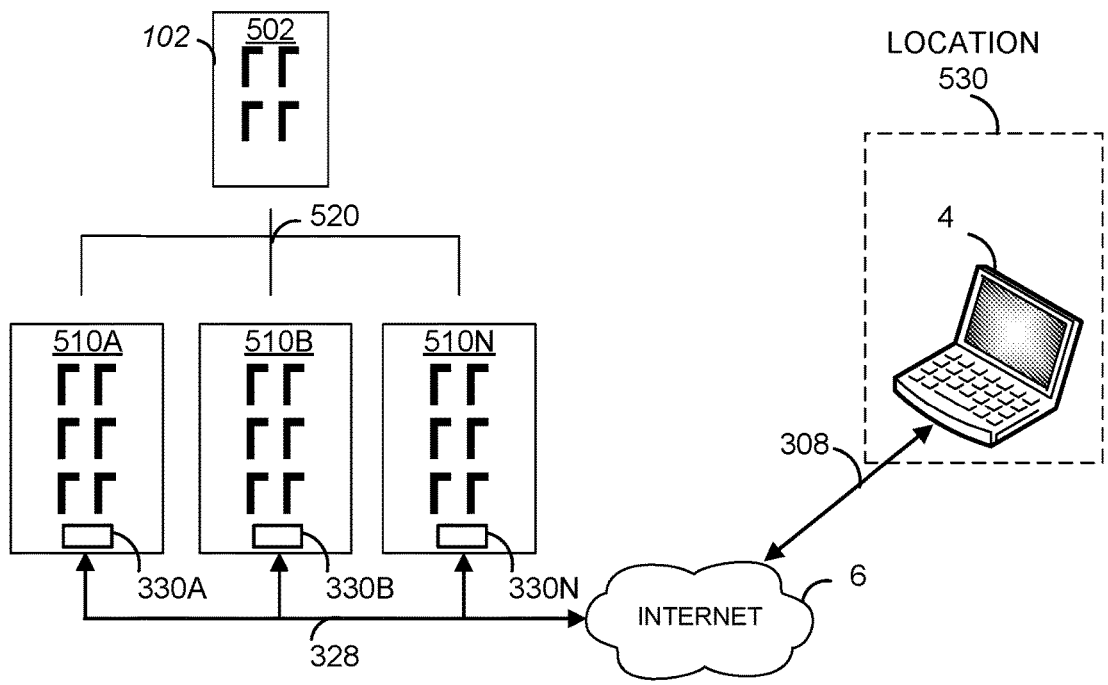
FIGS. 5A, 5B, 5C, and 5D are block diagrams illustrating various connections between a client device and one or more VPN gateways, according to one or more aspects of the present disclosure.

FIGS. 5A, 5B, 5C, and 5D illustrate various connections between a client device 4 and one or more VPN gateways 330, according to one or more aspects of the present disclosure. Referring to FIG. 5A, in one or more embodiments, a client device 4 at a location 530 can comprise a VPN manager 310 of FIG. 3. The location 530 is located remote from the target source 102, such as a central office, an office network, a central hub, a data repository, a resource, a service, or other remote source. The target source 102 can be associated with one or more regional VPN gateways 330 at one or more regional locations 510A, 510B, 510N (collectively referred to as regional location(s) 510), where N represents any number of regional locations 510. For example, VPN gateway 330A at regional location 510A, VPN gateway 330B at regional location 510B, and VPN gateway 330N at regional location 510N can be connected to the target source 502 via one or more connections 520. A regional location 510 can be any geographical or virtual location, such as any of a city, a state, a country, a cloud computing system, a site, such as a building, any other location, or a combination thereof. In one or more embodiments, any one or more of the one or more VPN gateways 330 can be located at the same regional location 510, different regional locations 510, or any combination thereof. The VPN manager 310 of client device 4 can establish one or more VPN connections 308 via the Internet 6 to the one or more VPN gateways 330 so as to communicate data 328 between the target source 102 and the client device 4.

In one or more embodiments, the client device 4 includes a user interface 29 of FIG. 2 that interfaces with the VPN manager 310. The user interface 29 allows a user to enter one or more VPN session authorization parameters 630 for one or more available VPN gateways 330, for example, one or more of any of VPN gateway 330A, VPN gateway 330B, VPN gateway 330N, or any combination thereof. The VPN manager 310 can be initiated via the user interface 29, for example, via a user input of the user interface 29. The VPN manager 310 can open a distinct VPN session 350 of FIG. 3 for each of the available one or more VPN gateways 330 selected or identified via the user interface 29. The VPN manager 310 can perform an initial test of any one or more VPN status parameters 612 to determine, identify and/or select an initial VPN gateway 330 from the one or more VPN gateways 330 selected or identified. This initial VPN gateway 330 is associated with an initial VPN connection 308 for an initial VPN session 350. The client device 4 can communicate with the target source 102 via the initial VPN gateway 330. For example, the client device 4 can access any of data, one or more resources, and/or one or more services associated with the target source 102 via the initial VPN session 350.

The VPN manager 310 monitors the one or more VPN sessions 350 established for the one or more VPN gateways 330, for example, as discussed with reference to FIG. 3. Based on the monitoring, the VPN manager 310 can switch the routing of data from the client device 4 to any one or more of the VPN gateways 330 for which a VPN session 350 has been established. In one or more embodiments, the VPN manager 310 temporarily switches the routing of data from the initial gateway 330 to a different gateway 330. For example, if the initial VPN gateway 330 experiences an outage, the VPN manager 310 can temporarily switch routing to a different VPN gateway 330, monitor the initial VPN gateway 330, and switch routing back to the initial gateway 330 once the initial VPN gateway 330 is back online.

Figure 5B:
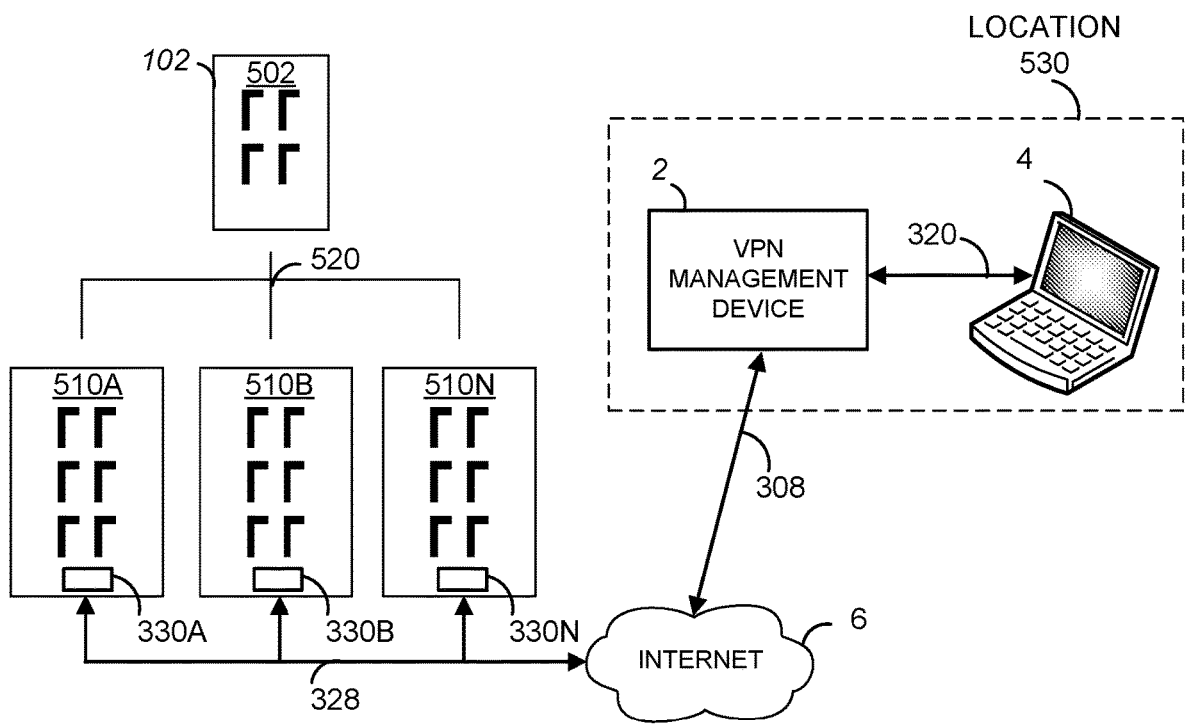

Turning to FIG. 5B, a client device 4 located at a location 530 can connect via connection 320 to a VPN management device 2. The VPN management device 2 can be configured by a entity or other user, such as by any of a corporate information technology personnel, a service provider, any other entity or person, and any combination thereof. For example, a user of client device 4 can be associated with a corporate entity that has a strategy for optimizing the one or more network resources and/or services associated with the corporate entity, such as target source 102. Providing a user of client device 4 with a configured VPN management device 2 can also minimize security risks associated with remote access to the target source 102. The VPN management device 2 can be located at location 530. For example, the VPN management device 2 can be installed and/or connected to the network, such as a LAN or WLAN, associated with the client device 4. After the VPN management device 2 is installed and/or connected to the network associated with location 530, the VPN management device 2 can operate as discussed with respect to FIGS. 3 and/or 5A. In one or more embodiments, the VPN manager 310 of the VPN management device 2 is configured such that the VPN manager 310 only allows data or traffic from approved client devices 4 to be routed to a particular VPN gateway 330, such as registered, authenticated, certified and/or otherwise approved client devices 4. For example, VPN gateways 330A-N may be associated with a corporate data resource 102 such that any client device 4 that attempts to initiate a VPN session 350 with any one or more of the VPN gateways 330A-N must provide login credentials or other authentication, such as username and/or password, before a VPN connection 308 is established and/or data, traffic from the client device 4 is routed to the VPN connection 308, or both. The registration, authentication, certifications, login credentials, approved client devices 4, other authentication, or any combination thereof can be stored as a VPN session status criteria 624, a VPN session authorization parameter 630, a VPN status parameter 612, any other location in memory, or any combination thereof.

Figure 5C:
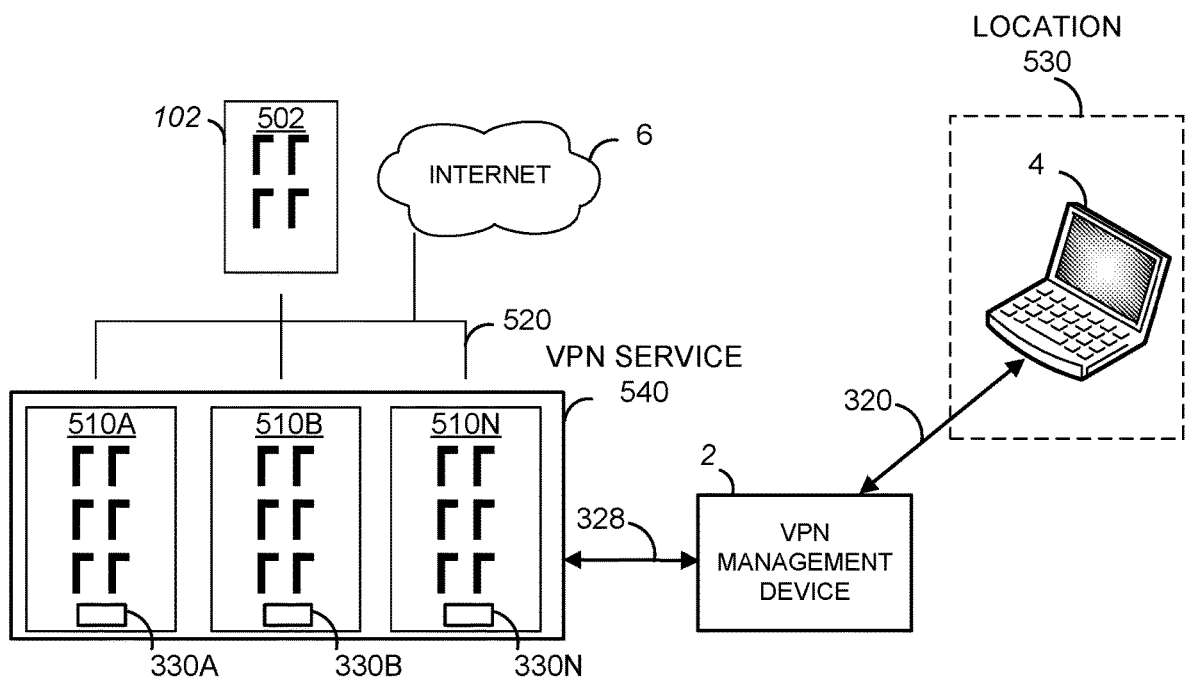

Turning to FIG. 5C, a client device 4 can be located at a location 530 and coupled to a VPN management device 2 via a connection 320, include a VPN management device 2, or both. The VPN management device 2 can connect the client device 4 to a VPN service 540. A VPN service 540 can provide access to one or more gateways 330 at one or more regional locations 510 to VPN management device 2. For example, restrictions may be imposed for a given resource or service offered by an entity via a website or other remote login portal. A country or entity, for example, can impose a tax or pricing may be adjusted based on the originating IP address of the client device 4. To avoid such restrictions, a user can subscribe to a VPN service 540 that data or traffic (for example, purchase requests or navigation requests) associated with the original IP address of the client device 4 is routed to a different region via tunnel to a target source 102, such as an online retailer, via a VPN gateway 330. The VPN service 540 can select the appropriate VPN gateway 330 to match a request from the client device 4. For example, a user of client device 4 can request the best pricing for a product. The VPN service 540 can search for the best pricing and then route data from the client device to a VPN gateway 330 that will provide the user with access to the best pricing by bypassing the restrictions imposed by a particular country based on origination of the IP address. In one or more embodiments, the VPN service 540 can provide a configuration file to the VPN manager 310 of a VPN management device 2, for example, one or more VPN session authorization parameters 630. In this way, any restrictions imposed based on a location and/or IP address can be bypassed so as to provide the user with an enhanced network experience.

Figure 5D:
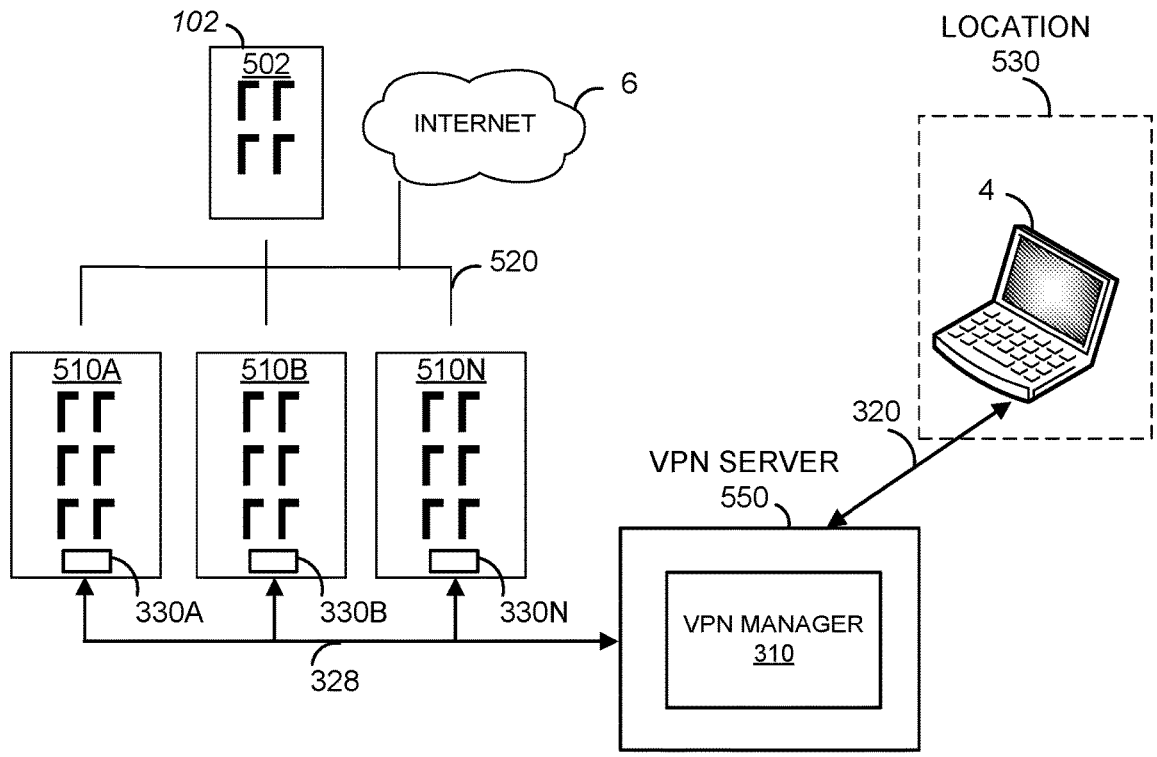

Turning to FIG. 5D, a client device 4 can be located at a location 530. The location 530 may have restrictions on access to resources and/or services that are available from a target source 102. In one or more embodiments, a target source 102 can include any of a website, a server, a data storage facility, an Internet 6, any other resource and/or service, or any combination thereof. To overcome the restrictions, the client device 4 can connect to a VPN server 550 that includes a VPN manager 310. The VPN manager 310 can manage a list of VPN gateways 330 that can provide access to a restricted target source 102 and/or Internet 6. For example, the VPN server 550 can coupled to one or more VPN gateways 330 at one or more regional locations 510 that are located outside the area where restrictions are imposed. The VPN server 550 can add and/or remove VPN gateways 330 should any VPN gateway 330 be compromised. For example, the VPN server 550 via the VPN manager 310 initially connects the client device 4 to a VPN gateway 330A. During monitoring of the VPN gateway 330A, the VPN manager 310 determines that the VPN manager 330A has been comprised or traffic associated with the VPN manager 330A is blocked, the VPN manager 310 can switch routing of data from the client device 4 to VPN gateway 330B. An additional VPN gateway 330N can be added and associated with another VPN session to provide additional access to a target source 102 or Internet 6 should the VPN gateway 330B be compromised or blocked. For example, any one or more VPN gateways 330 can be located outside the country associated with location 530 such that the client device 4 can securely and unrestrictedly access a target source 102 and/or Internet 6. In this way, the VPN server 550 can ensure that data associated with the client device 4 is automatically routed to a VPN gateway 330 that provides access to data, one or more resources, and/or one or more services, for example, as provided by target source 102 and/or Internet 6.

Figure 7:
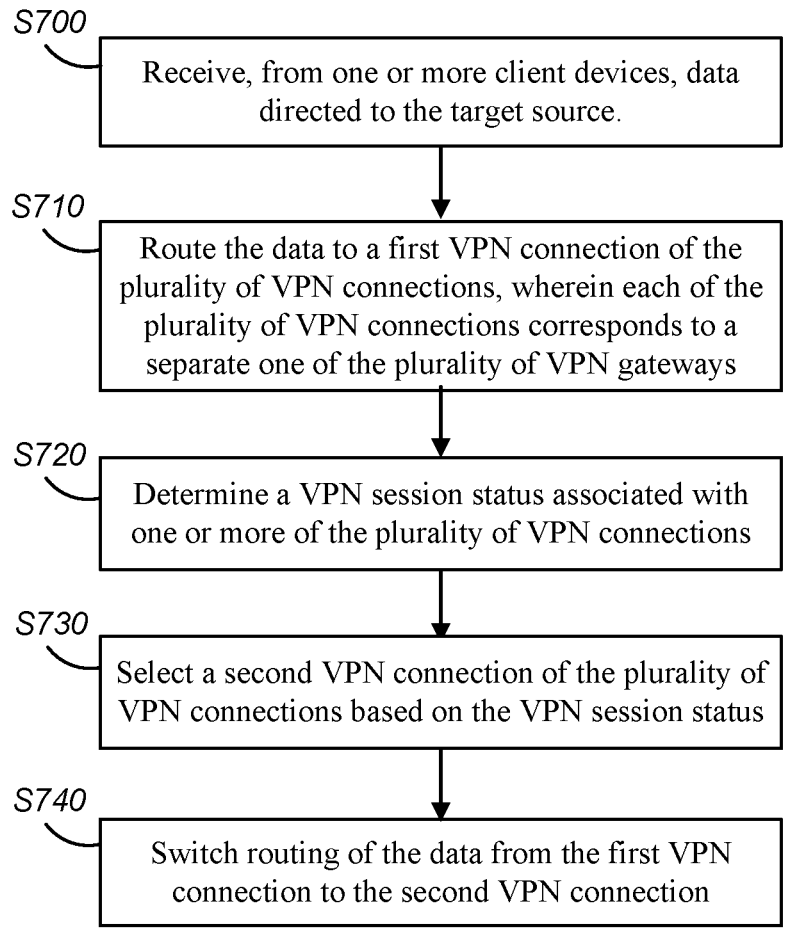
FIG. 7 is a flow chart illustrating managing, monitoring and configuring a VPN connection utilizing a VPN manager, according to one or more aspects of the present disclosure.

FIG. 7 is a flow chart illustrating a method for managing, monitoring, and configuring a VPN connection 308 utilizing a VPN manager 310, according to one or more aspects of the present disclosure. For example, the method improves the QOE of a user and/or one or more network parameters by automatically, transparently, or seamlessly routing data and/or traffic from one or more client devices 4 to a VPN gateway 330 associated with a VPN connection 308 based on suitability of the VPN connection 308 and/or VPN gateway 330, such as according to a VPN session status configuration 620.

A VPN management device 2 and/or a client device 4 may be programmed with one or more computer-readable instructions such as a provisioning application that when executed by a controller 26 and/or 33, respectively, cause the VPN management device 2 and/or the client device 4 to manage, monitor, and/or configure a VPN Session, such as a VPN Connection 308 to a VPN gateway 330 of a target source 102, according to one or more embodiments so as to provide an enhanced QoE for users of a network environment by providing automatic or seamless switching of routing of data and/or traffic between VPN connections 308 associated with a VPN gateway 330. In FIG. 7, it is assumed that any one or more of the devices include their respective controllers and their respective software stored in their respective memories, as discussed above in connection with FIGS. 1A, 1B, 2, 3, and/or 4, which when executed by their respective controllers perform the functions and operations in accordance with the example embodiments of the present disclosure (e.g., including performing a configuration of one or more network devices). While the steps S710-S770 are presented in a certain order, the present disclosure contemplates that any one or more steps can be performed simultaneously, substantially simultaneously, repeatedly, in any order or not at all (omitted).

A method for a VPN manager 310 to manage a plurality of VPN connections 350 to a target source 102 via a plurality of VPN gateways 330 is discussed with reference to FIG. 7. At step S700, the VPN manager 310 of a VPN management device 2 can receive, from one or more client devices 4, data directed to a target source 102. For example, a client device 4 can be connected to a network that includes a VPN management device 2, the client device 4 can comprise a VPN management device and/or a VPN manager 310, the VPN management device 2 and/or the VPN manager 310 can be coupled to the network, or any combination thereof. In one or more embodiments, a first data is received from a first client device 4 while a second data is received from a second client device 4. Both the first data and the second data can be directed to a target source 102, such as to the same data, resource or service or to different data, resources, or services.

At step S710, the VPN manager 310 routes the data to a first VPN connection, for example, 308A, of the plurality of VPN connections 308. Each of the plurality of VPN connections 308 corresponds to a separate one of the plurality of VPN gateways 330. In one or more embodiments, the client device 4 can comprise a user interface 29 that allows a user or application to select one or more VPN gateways 330. Each selected one or more VPN gateways 330 are associated with a corresponding one or more VPN sessions 350. For example, a VPN session 350A can be associated with a VPN gateway 330A via a VPN connection 308A as discussed with reference to FIG. 3. In one or more embodiments, the first data and the second data discussed with reference to S700 can be routed to the first VPN connection 308. In one or more embodiments, prior to routing data to a VPN connection 308, the VPN manager 310 can perform an analysis based on a VPN status parameter configuration 610 associated with a VPN session status configuration 620, for example, as discussed with respect to steps S720-S740.

At step S720, the VPN manager 310 can determine a VPN session status 632 associated with one or more of the plurality of VPN connections 308. The determining the VPN session status 632 can comprise analyzing one or more VPN session status criteria 624 associated with the one or more of the plurality of VPN connections 308. The VPN session status criteria 624 can be configurable such that any of each VPN connection 308, VPN gateway 330, client device 4, a user associated with client device 4, or any combination thereof can be associated with one or more VPN session status criteria 624. In one or more embodiments, a user interface of the VPN management device 2, a client device 4, any other network device connected to the VPN management device 2, or any combination thereof can be utilized to configure any of a VPN status parameter configuration 610 that can comprise one or more VPN status parameters 612 and/or a weight 614 corresponding to the one or more VPN status parameters 612, a VPN session status configuration 620 that can comprise a VPN gateway identifier 622, a VPN session status frequency 626, and/or a VPN session status criteria 624, one or more VPN session authorization parameters 630, or any combination thereof.

At step S730, the VPN manager 310 can select a second VPN connection 308 of the plurality of VPN connections 308 based on the VPN session status 632. The VPN session status 632 for each of the one or more of the plurality of VPN connections 308 can be determined by the VPN manager 310 as discussed, for example, with reference to Table 2 and FIG. 3. For example, the VPN session status can comprise performing a load balancing of the plurality of VPN connections 308. In one or more embodiments, a type associated with the data is determined and the VPN session status 632 is determined based on the determined type of data. For example, the first VPN connection 308 can be associated with a first type of data and the second VPN connection 308 can be associated with a second type of data. A client device 4 can initially request streaming content from a target source 102 and then switch to requesting download of sensitive encrypted information. The streaming content can be received via a first VPN connection 308 and then the VPN manager 310 can switch to a second VPN connection 308 for downloading of the sensitive encrypted information. Such switching of VPN connections 308 can be performed without any user input or disruption in service and/or interruption in the experience or Quek of the user. Continuously or otherwise periodically monitoring the one or more VPN connections 308 to determine the VPN session status 632 allows the VPN manager 310 to periodically, routinely, seamlessly, at any specified time period, any other factor, or any combination thereof to maintain or manage the VPN connections 308 such that the VPN connection 308 can be selected that enhances or fits the needs of a user, a client device 4, or both.

At step S740, the VPN manager 310 can switch routing of the data from the first VPN connection 308 to the second VPN connection 308. The VPN manager 310 can automatically or seamlessly switch the routing of the data. In one or more embodiments, the VPN manager 310 switches the routing in real-time or instantaneously, for example, each time a VPN session status 632 is determined that results in the selection of a different VPN connection 308. In one or more embodiments, the routing of the data is switched after a time period, timed interval, or other delay. In one or more embodiments, the routing of the data is switched based on a comparison of a first VPN session status 632 determined at a first time to a second VPN session status 632 determined at a second time any other function or analysis applied to one or more VPN session statuses 632, or both. For example, after the VPN manager 310 determines that the routing of the data should be switched, the VPN manager 310 may delay for a period of time, make another VPN session status 632 determination to verify that the routing of the data should be switched, and then after this validation, the VPN manager 310 switches the routing of the data to the new VPN connection 308. In one or more embodiments, the first data in reference to step S 710 is switched for routing purposes to the second VPN connection 308 while the second data remains routed through the first VPN connection 308. In this way, one or more client devices can utilize the same VPN connection 308 or different VPN connections 308 similar to the functionality of a router.

According to one or more example embodiments of inventive concepts disclosed herein, there are provided novel solutions for managing, configuring, and monitoring one or more VPN sessions that are associated with one or more VPN connections to one or more respective VPN gateway which can provide an enhanced QoE for a user by automatically and/or seamlessly switching routing of data from an initial VPN connection to a different VPN connection so as to transmit encrypted data to and from a VPN gateway based on a status monitor configuration.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or

What we claim is:

1. A method for a virtual private network (VPN) manager to manage a plurality of VPN connections to a target source via the Internet and a plurality of VPN gateways of the target source comprising:
   establishing the plurality of VPN connections of the VPN manager to the plurality of VPN gateways of the target source;
   receiving, from one or more client devices, data directed to the target source, wherein the target source is remote from the VPN manager;
   monitoring one or more VPN status parameters associated with one or more VPN sessions via one or more paths of the VPN manager to the one or more of the plurality of VPN connections of the VPN manager, wherein each of the plurality of VPN connections corresponds to a separate one of the plurality of VPN gateways;
   determining a VPN session status associated with the one or more of the plurality of VPN connections based on the monitoring;
   selecting a first VPN connection of the plurality of VPN connections based on the VPN session status; and
   routing the data to the first VPN connection for transmission of the data over the Internet to the separate one or more of the plurality of VPN gateways corresponding to the first VPN connection;
   monitoring the VPN session status of the one or more of the plurality of VPN connections;
   selecting a second VPN connection of the plurality of VPN connections based on the VPN session status; and
   switching routing of the data from the first VPN connection to the second VPN connection.

2. The method of claim 1, wherein determining the VPN session status comprises analyzing one or more VPN session status criteria associated with the one or more of the plurality of VPN connections.

3. The method of claim 1, wherein monitoring the VPN session status is performed based on a timed interval.

4. The method of claim 1, wherein determining the VPN session status comprises performing a load balancing of the plurality of VPN connections.

5. The method of claim 1, further comprising:
   determining a type of data associated with the data;
   wherein determining the VPN session status is based on the type of data; and
   wherein the first VPN connection is associated with a first type of data and a second VPN connection is associated with a second type of data.

6. The method of claim 1, further comprising:
   receiving additional data from an additional client device;
   determining an additional VPN session status;
   selecting a second VPN connection of the plurality of VPN connections based on the additional VPN session status; and
   routing the additional data to the second VPN connection.

7. A virtual private network (VPN) manager, the VPN manager comprising:
   a memory storing one or more instructions;
   a processor coupled to the memory, wherein the one or more instructions are executable by the processor, and wherein the one or more instructions include:
   a VPN configuration manager that:
      establishes a plurality of VPN connections of the VPN manager to a plurality of VPN gateways of a target source;
      manages the plurality of VPN connections to the target source via the Internet and the plurality of VPN gateways, wherein each of the plurality of VPN connections corresponds to a separate one of the plurality of VPN gateways;
   a VPN connection monitor that:
      monitors one or more VPN status parameters associated with one or more VPN sessions via one or more paths of the VPN manager to the one or more of the plurality of VPN connections of the VPN manager; and
      determines a VPN session status associated with the one or more of the plurality of VPN connections based on the monitoring; and
      monitors the VPN session status of the one or more of the plurality of VPN connections; and
   a VPN routing manager that:
      receives data from one or more client devices directed to the target source, wherein the target source is remote from the VPN manager;
      selects a first VPN connection of the plurality of VPN connections based on the VPN session status; and
      routes the data to the first VPN connection for transmission of the data over the Internet to the separate one or more of the plurality of VPN gateways corresponding to the first VPN connection;
      selects a second VPN connection of the plurality of VPN connections based on the VPN session status; and
      switches routing of the data from the first VPN connection to the second VPN connection.

8. The VPN manager of claim 7, wherein determining the VPN session status comprises analyzing one or more VPN session status criteria associated with the one or more of the plurality of VPN connections, wherein the VPN session status criteria comprise any of a connection state, a ping speed, a speed test, a throughput rate, a bandwidth, a latency, a received signal strength indicator, and any combination thereof.

9. The VPN manager of claim 7, wherein monitoring the VPN session status is performed based on a timed interval.

10. The VPN manager of claim 7, wherein determining the VPN session status comprises performing a load balancing of the plurality of VPN connections.

11. The VPN manager of claim 7, wherein:
   the VPN routing manager further determines a type of data associated with the data;
   the determining the VPN session status is based on the type of data; and
   the first VPN connection is associated with a first type of data and a second VPN connection is associated with a second type of data.

12. The VPN manager of claim 7, wherein:
   the routing manager further receives additional data from an additional client device;
   the VPN connection monitor determines an additional VPN session status; and
   the VPN routing manager further:
      selects a second VPN connection of the plurality of VPN connections based on the additional VPN session status; and routes the additional data to the second VPN connection.

13. A non-transitory computer-readable medium storing one or more instructions for managing a plurality of virtual private network (VPN) connections to a target source via the Internet and a plurality of VPN gateways, that when executed by a processor, cause the processor to perform one or more operations comprising:
  establishing the plurality of VPN connections of the VPN manager to the plurality of VPN gateways of the target source;
  receiving, from one or more client devices, data directed to the target source, wherein the target source is remote from the VPN manager;
  monitoring one or more VPN status parameters associated with one or more VPN sessions via one or more paths of the VPN manager to the one or more of the plurality of VPN connections of the VPN manager, wherein each of the plurality of VPN connections corresponds to a separate one of the plurality of VPN gateways;
  determining a VPN session status associated with the one or more of the plurality of VPN connections based on the monitoring
  selecting a first VPN connection of the plurality of VPN connections based on the VPN session status; and
  routing the data to the first VPN connection for transmission of the data over the Internet to the separate one or more of the plurality of VPN gateways corresponding to the first VPN connection;
  monitoring the VPN session status of the one or more of the plurality of VPN connections;
  selecting a second VPN connection of the plurality of VPN connections based on the VPN session status; and
  switching routing of the data from the first VPN connection to the second VPN connection.

14. The method of claim 13, wherein determining the VPN session status comprises analyzing one or more VPN session status criteria associated with the one or more of the plurality of VPN connections.

15. The non-transitory computer-readable medium of claim 13, wherein determining the VPN session status comprises performing a load balancing of the plurality of VPN connections.

16. The non-transitory computer-readable medium of claim 13, wherein the one or more instructions when executed by the processor, further cause the processor to perform the one or more operations further comprising:
  determining a type of data associated with the data;
  wherein determining the VPN session status is based on the type of data; and
  wherein the first VPN connection is associated with a first type of data and a second VPN connection is associated with a second type of data.

17. The non-transitory computer-readable medium of claim 13, wherein the one or more instructions when executed by the processor, further cause the processor to perform the one or more operations further comprising:
  receiving additional data from an additional client device;
  determining an additional VPN session status;
  selecting a second VPN connection of the plurality of VPN connections based on the additional VPN session status; and
  routing the additional data to the second VPN connection.

* * * * *